United States Patent
Svendsen et al.

(10) Patent No.: US 8,504,073 B2
(45) Date of Patent: Aug. 6, 2013

(54) CUSTOMIZED CONTENT DELIVERY THROUGH THE USE OF ARBITRARY GEOGRAPHIC SHAPES

(75) Inventors: Hugh Svendsen, Chapel Hill, NC (US); Olivia Marie Marsh, Raleigh, NC (US); Gregory M. Evans, Raleigh, NC (US)

(73) Assignee: Teaneck Enterprises, LLC, Portsmouth, NH (US)

( * ) Notice: Subject to any disclaimer, the term of this patent is extended or adjusted under 35 U.S.C. 154(b) by 784 days.

(21) Appl. No.: 12/189,861

(22) Filed: Aug. 12, 2008

(65) Prior Publication Data

US 2010/0041419 A1   Feb. 18, 2010

(51) Int. Cl.
- *G06F 15/16* (2006.01)
- *G06F 7/00* (2006.01)
- *H04M 3/42* (2006.01)

(52) U.S. Cl.
USPC ...... 455/456.3; 709/218; 707/724; 455/414.2

(58) Field of Classification Search
USPC . 455/456, 67.11, 512, 404; 707/724; 709/218
See application file for complete search history.

(56) References Cited

U.S. PATENT DOCUMENTS

| | | |
|---|---|---|
| 3,993,955 A | 11/1976 | Belcher et al. |
| 4,054,911 A | 10/1977 | Fletcher et al. |
| 4,058,830 A | 11/1977 | Guinet et al. |
| 4,099,258 A | 7/1978 | Parsons |
| 4,155,042 A | 5/1979 | Permut et al. |
| 4,155,662 A | 5/1979 | Maroth |
| 4,311,876 A | 1/1982 | Endo et al. |
| 4,322,854 A | 3/1982 | Bundens et al. |
| 4,323,921 A | 4/1982 | Guillou |
| 4,361,848 A | 11/1982 | Poignet et al. |
| 4,380,821 A | 4/1983 | Eckhardt |
| 4,420,833 A | 12/1983 | Noirel |
| 4,450,477 A | 5/1984 | Lovett |
| 4,450,481 A | 5/1984 | Dickinson |
| 4,598,385 A | 7/1986 | Kessels et al. |

(Continued)

FOREIGN PATENT DOCUMENTS

| | | |
|---|---|---|
| GB | 2399928 A | 9/2004 |
| NL | 8005861 | 5/1982 |

(Continued)

OTHER PUBLICATIONS

"Internet Relay Chat—Wikipedia, the free encyclopedia," http://en.wikipedia.org/wiki/IRC, printed Nov. 16, 2007, 11 pages.

(Continued)

*Primary Examiner* — Nizar Sivji

(57) ABSTRACT

Methods and systems are disclosed for providing customized content to users based on their location. In one embodiment, for each of one or more content providers, a customized content delivery function receives information from the content provider defining a number of geographic shapes selecting corresponding geographic areas. Preferably, each of the geographic shapes overlaps at least one other of the geographic shapes and is assigned an importance level. For each geographic shape, the content provider defines one or more tags for the geographic shape and assigns a weight to each of the one or more tags. Thereafter, when a request is received from a requestor, one or more content items are selected for delivery to the requestor based on the geographic shapes, the tags and corresponding weights for the geographic shapes, and the location of the requestor.

37 Claims, 16 Drawing Sheets

U.S. PATENT DOCUMENTS

| | | |
|---|---|---|
| 4,600,921 A | 7/1986 | Thomas |
| 4,602,279 A | 7/1986 | Freeman |
| 4,677,686 A | 6/1987 | Hustig et al. |
| 4,680,629 A | 7/1987 | Fukushima et al. |
| 4,686,564 A | 8/1987 | Masuko et al. |
| 4,734,764 A | 3/1988 | Pocock et al. |
| 4,757,371 A | 7/1988 | Nozawa et al. |
| 4,758,959 A | 7/1988 | Thoone et al. |
| 4,783,654 A | 11/1988 | Ichikawa |
| 4,818,987 A | 4/1989 | Ide et al. |
| 4,829,372 A | 5/1989 | McCalley et al. |
| 4,860,379 A | 8/1989 | Schoeneberger et al. |
| 4,862,513 A | 8/1989 | Bragas |
| 4,868,866 A | 9/1989 | Williams, Jr. |
| 4,894,789 A | 1/1990 | Yee |
| 4,903,212 A | 2/1990 | Yokouchi et al. |
| 4,907,159 A | 3/1990 | Mauge et al. |
| 4,951,211 A | 8/1990 | De Villeroche |
| 4,975,693 A | 12/1990 | Davis et al. |
| 4,975,694 A | 12/1990 | McLaughlin et al. |
| 5,020,143 A | 5/1991 | Duckeck et al. |
| 5,036,537 A | 7/1991 | Jeffers et al. |
| 5,065,452 A | 11/1991 | Duckeck et al. |
| 5,070,404 A | 12/1991 | Bullock et al. |
| 5,095,532 A | 3/1992 | Mardus |
| 5,101,510 A | 3/1992 | Duckeck |
| 5,111,400 A | 5/1992 | Yoder |
| 5,121,430 A | 6/1992 | Ganzer et al. |
| 5,126,941 A | 6/1992 | Gurmu et al. |
| 5,155,591 A | 10/1992 | Wachob |
| 5,164,904 A | 11/1992 | Sumner |
| 5,173,691 A | 12/1992 | Sumner |
| 5,181,208 A | 1/1993 | Duckeck |
| 5,182,555 A | 1/1993 | Sumner |
| 5,193,214 A | 3/1993 | Mardus et al. |
| 5,206,641 A | 4/1993 | Grant et al. |
| 5,257,023 A | 10/1993 | Furuya |
| 5,260,778 A | 11/1993 | Kauffman et al. |
| 5,265,024 A | 11/1993 | Crabill et al. |
| 5,274,387 A | 12/1993 | Kakihara et al. |
| 5,276,909 A | 1/1994 | Milner et al. |
| 5,293,163 A | 3/1994 | Kakihara et al. |
| 5,303,401 A | 4/1994 | Duckeck et al. |
| 5,315,295 A | 5/1994 | Fujii |
| 5,317,311 A | 5/1994 | Martell et al. |
| 5,345,606 A | 9/1994 | Duckeck et al. |
| 5,345,607 A | 9/1994 | Liman et al. |
| 5,369,588 A | 11/1994 | Hayami et al. |
| 5,406,490 A | 4/1995 | Braegas |
| 5,432,542 A | 7/1995 | Thibadeau et al. |
| 5,438,687 A | 8/1995 | Suchowerskyj et al. |
| 5,493,692 A | 2/1996 | Theimer et al. |
| 5,565,909 A | 10/1996 | Thibadeau et al. |
| 5,652,841 A | 7/1997 | Nemirovsky et al. |
| 5,752,177 A | 5/1998 | Siegle et al. |
| 5,754,939 A | 5/1998 | Herz et al. |
| 5,784,691 A | 7/1998 | Ruhl |
| 5,796,727 A | 8/1998 | Harrison et al. |
| 5,903,901 A | 5/1999 | Kawakura et al. |
| 5,933,094 A | 8/1999 | Goss et al. |
| 5,949,776 A | 9/1999 | Mahany et al. |
| 5,987,382 A | 11/1999 | Weishaupt et al. |
| 6,014,090 A | 1/2000 | Rosen et al. |
| 6,049,711 A | 4/2000 | Ben-Yehezkel et al. |
| 6,185,427 B1 | 2/2001 | Krasner et al. |
| 6,212,392 B1 | 4/2001 | Fitch et al. |
| 6,240,069 B1 | 5/2001 | Alperovich et al. |
| 6,259,381 B1 | 7/2001 | Small |
| 6,259,405 B1 | 7/2001 | Stewart et al. |
| 6,295,528 B1 | 9/2001 | Marcus et al. |
| 6,326,918 B1 | 12/2001 | Stewart |
| 6,349,203 B1 | 2/2002 | Asaoka et al. |
| 6,438,561 B1 | 8/2002 | Israni et al. |
| 6,456,234 B1 | 9/2002 | Johnson |
| 6,505,046 B1 | 1/2003 | Baker |
| 6,529,136 B2 | 3/2003 | Cao et al. |
| 6,539,232 B2 | 3/2003 | Hendrey et al. |
| 6,542,750 B2 | 4/2003 | Hendrey et al. |
| 6,552,682 B1 | 4/2003 | Fan |
| 6,571,279 B1 | 5/2003 | Herz et al. |
| 6,618,593 B1 | 9/2003 | Drutman et al. |
| 6,647,257 B2 | 11/2003 | Owensby |
| 6,650,902 B1 | 11/2003 | Richton |
| 6,675,015 B1 | 1/2004 | Martini et al. |
| 6,675,268 B1 | 1/2004 | DeKoning et al. |
| 6,853,841 B1 | 2/2005 | St. Pierre |
| 6,876,642 B1 | 4/2005 | Adams et al. |
| 6,882,853 B2 | 4/2005 | Meyers |
| 6,937,860 B2 | 8/2005 | Jahn |
| 6,947,571 B1 | 9/2005 | Rhoads et al. |
| 6,954,443 B2 | 10/2005 | Forstadius et al. |
| 6,970,703 B2 | 11/2005 | Fuchs et al. |
| 6,975,266 B2 | 12/2005 | Abraham et al. |
| 6,990,497 B2 | 1/2006 | O'Rourke |
| 7,020,710 B2 | 3/2006 | Weber et al. |
| 7,035,618 B2 | 4/2006 | Schnurr |
| 7,035,912 B2 | 4/2006 | Arteaga |
| 7,047,315 B1 | 5/2006 | Srivastava |
| 7,085,571 B2 | 8/2006 | Kalhan et al. |
| 7,107,038 B2 | 9/2006 | Fitch et al. |
| 7,134,040 B2 | 11/2006 | Ayres |
| 7,171,018 B2 | 1/2007 | Rhoads et al. |
| 7,200,638 B2 | 4/2007 | Lake |
| 7,203,753 B2 | 4/2007 | Yeager et al. |
| 7,206,568 B2 | 4/2007 | Sudit |
| 7,218,611 B2 | 5/2007 | Mimura et al. |
| 7,240,106 B2 | 7/2007 | Cochran et al. |
| 7,249,367 B2 | 7/2007 | Bove, Jr. et al. |
| 7,260,638 B2 | 8/2007 | Crosbie |
| 7,269,854 B2 | 9/2007 | Simmons et al. |
| 7,272,357 B2 | 9/2007 | Nishiga et al. |
| 7,319,379 B1 | 1/2008 | Melvin |
| 7,340,768 B2 | 3/2008 | Rosenberger |
| 7,343,160 B2 | 3/2008 | Morton |
| 7,359,894 B1 | 4/2008 | Liebman et al. |
| 7,373,109 B2 | 5/2008 | Pohja et al. |
| 7,395,031 B1 | 7/2008 | Ritter |
| 7,484,103 B2 | 1/2009 | Woo et al. |
| 7,509,131 B2 | 3/2009 | Krumm et al. |
| 7,512,702 B1 | 3/2009 | Srivastava et al. |
| 7,516,212 B2 | 4/2009 | Nguyen et al. |
| 7,620,404 B2 | 11/2009 | Chesnais et al. |
| 7,668,832 B2 | 2/2010 | Yeh et al. |
| 7,684,815 B2 | 3/2010 | Counts et al. |
| 7,920,876 B2 * | 4/2011 | Rahman .................. 455/456.1 |
| 2001/0039659 A1 | 11/2001 | Simmons et al. |
| 2001/0048449 A1 | 12/2001 | Baker |
| 2002/0019829 A1 | 2/2002 | Shapiro |
| 2002/0044067 A1 | 4/2002 | Ilcisin |
| 2002/0086659 A1 | 7/2002 | Lauper |
| 2002/0086676 A1 | 7/2002 | Hendrey et al. |
| 2002/0171581 A1 | 11/2002 | Sheynblat et al. |
| 2003/0022675 A1 | 1/2003 | Mergler |
| 2003/0050062 A1 | 3/2003 | Chen et al. |
| 2003/0065721 A1 | 4/2003 | Roskind |
| 2003/0083931 A1 | 5/2003 | Lang |
| 2003/0229549 A1 | 12/2003 | Wolinsky et al. |
| 2004/0107219 A1 | 6/2004 | Rosenberger |
| 2004/0117500 A1 | 6/2004 | Lindholm et al. |
| 2004/0148393 A1 | 7/2004 | Breiter et al. |
| 2004/0160307 A1 | 8/2004 | Saikkonen et al. |
| 2004/0225519 A1 | 11/2004 | Martin |
| 2004/0254886 A1 | 12/2004 | Siepen et al. |
| 2005/0015800 A1 | 1/2005 | Holcomb |
| 2005/0021369 A1 | 1/2005 | Cohen et al. |
| 2005/0033780 A1 | 2/2005 | Simelius et al. |
| 2005/0038876 A1 | 2/2005 | Chaudhuri |
| 2005/0050027 A1 | 3/2005 | Yeh et al. |
| 2005/0059379 A1 | 3/2005 | Sovio et al. |
| 2005/0060350 A1 | 3/2005 | Baum et al. |
| 2005/0071221 A1 | 3/2005 | Selby |
| 2005/0160270 A1 | 7/2005 | Goldberg et al. |
| 2005/0174975 A1 | 8/2005 | Mgrdechian et al. |
| 2005/0197846 A1 | 9/2005 | Pezaris et al. |
| 2005/0198097 A1 | 9/2005 | Kalnitsky |
| 2005/0245233 A1 | 11/2005 | Anderson |
| 2005/0251453 A1 | 11/2005 | Lu |

| | | |
|---|---|---|
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0261001 A1* | 11/2005 | Marley et al. ............. 455/456.1 |
| 2005/0272413 A1 | 12/2005 | Bourne |
| 2005/0280557 A1 | 12/2005 | Jha et al. |
| 2006/0059142 A1 | 3/2006 | Zvinyatskovsky et al. |
| 2006/0085419 A1 | 4/2006 | Rosen |
| 2006/0085821 A9 | 4/2006 | Simmons et al. |
| 2006/0099963 A1 | 5/2006 | Stephens |
| 2006/0123080 A1 | 6/2006 | Baudino et al. |
| 2006/0149628 A1 | 7/2006 | Chefalas et al. |
| 2006/0149631 A1 | 7/2006 | Brazell et al. |
| 2006/0167985 A1 | 7/2006 | Albanese et al. |
| 2006/0168264 A1 | 7/2006 | Baba et al. |
| 2006/0218225 A1 | 9/2006 | Hee Voon et al. |
| 2006/0223518 A1 | 10/2006 | Haney |
| 2006/0229939 A1 | 10/2006 | Bhakta et al. |
| 2006/0240856 A1 | 10/2006 | Counts et al. |
| 2006/0269058 A1 | 11/2006 | Kessler et al. |
| 2006/0271281 A1 | 11/2006 | Ahn et al. |
| 2006/0287915 A1 | 12/2006 | Boulet et al. |
| 2007/0077942 A1 | 4/2007 | Heaven et al. |
| 2007/0121843 A1 | 5/2007 | Atazky et al. |
| 2007/0136132 A1 | 6/2007 | Weiser et al. |
| 2007/0147411 A1 | 6/2007 | Bijwaard et al. |
| 2007/0168254 A1 | 7/2007 | Steelberg et al. |
| 2007/0174243 A1 | 7/2007 | Fritz |
| 2007/0205276 A1 | 9/2007 | Sodan et al. |
| 2007/0218867 A1 | 9/2007 | Mononen et al. |
| 2007/0249327 A1 | 10/2007 | Nurmi |
| 2007/0260508 A1 | 11/2007 | Barry et al. |
| 2007/0271136 A1 | 11/2007 | Strauss et al. |
| 2007/0281689 A1 | 12/2007 | Altman et al. |
| 2008/0016205 A1 | 1/2008 | Svendsen |
| 2008/0033809 A1 | 2/2008 | Black et al. |
| 2008/0081638 A1 | 4/2008 | Boland et al. |
| 2008/0097999 A1 | 4/2008 | Horan |
| 2008/0133484 A1 | 6/2008 | Yamamoto |
| 2008/0148175 A1 | 6/2008 | Naaman et al. |
| 2008/0182591 A1 | 7/2008 | Krikorian |
| 2008/0208652 A1 | 8/2008 | Srivastava |
| 2008/0250337 A1 | 10/2008 | Lemmela et al. |
| 2008/0268822 A1* | 10/2008 | Johnson et al. ............ 455/414.2 |
| 2008/0288375 A1 | 11/2008 | Uhrig et al. |
| 2008/0307108 A1 | 12/2008 | Yan et al. |
| 2008/0312946 A1* | 12/2008 | Valentine et al. ................. 705/1 |
| 2009/0030999 A1 | 1/2009 | Gatzke et al. |
| 2009/0055229 A1 | 2/2009 | Lidgren et al. |
| 2009/0085724 A1 | 4/2009 | Naressi et al. |
| 2009/0315670 A1 | 12/2009 | Naressi et al. |
| 2010/0015991 A1 | 1/2010 | Evans et al. |

FOREIGN PATENT DOCUMENTS

| | | |
|---|---|---|
| WO | 90/05969 A2 | 5/1990 |
| WO | 90/13882 A1 | 11/1990 |
| WO | 91/07029 A1 | 5/1991 |
| WO | 91/14154 A1 | 9/1991 |
| WO | 99/05877 A1 | 2/1999 |
| WO | 00/04730 A1 | 1/2000 |
| WO | 01/24551 A1 | 4/2001 |
| WO | 02/29506 A2 | 4/2002 |
| WO | 02/062092 A1 | 8/2002 |
| WO | 20061082566 A1 | 8/2006 |

OTHER PUBLICATIONS

"Instant Messenger—AIM—Instant Message Your Online Buddies for Free—AIM," http://dashboard.aim.com/aim, copyright 2007 AOL LLC, printed Nov. 8, 2007, 6 pages.
"Windows Live Messenger—Overview," http://get.live.com/messenger/overview, copyright 2007 Microsoft Corp., printed Nov. 28, 2007, 1 page.
"Bluetooth.com—Learn," http://www.bluetooth.com/Bluetooth/Learn/, copyright 2007 Bluetooth SIG, Inc., printed Oct. 26, 2007, 1 page.
"dodgeball.com :: mobile social software," http://www.dodgeball.com/, copyright 2008 Google Inc., printed Jan. 16, 2008, 1 page.
"eHarmony," http://eharmony.com/, copyright 2000-2008 eHarmony.com, printed Jan. 16, 2008, 1 page.
"flickr," http://www.flickr.com/, copyright 2008 Yahoo! Inc., printed Jan. 16, 2008, 1 page.
"Friendster—Home," http://www.friendster.com/, copyright 2002-2007 Friendster, Inc., printed Jan. 16, 2008, 1 page.
"Google Talk," http://www.google.com/talk/, copyright 2008 Google, printed Jan. 16, 2008, 1 page.
"iChat. Not being there is half the fun," http://www.apple.com/macosx/features/ichat.html, printed Jan. 16, 2008, 1 page.
"icq," http://www.icq.com/, copyright 1998-2008 ICQ Inc., printed Jan. 16, 2008, 2 pages.
"IEEE 802.11," http://en.wikipedia.org/wiki/IEEE_802.11, printed Oct. 26, 2007, 5 pages.
"Anthem—Overview," http://www.intercastingcorp.com/platform/anthem, copyright 2004-2007 Intercasting Corp., printed Jan. 16, 2008, 2 pages.
"Apple—iPod classic," http://www.apple.com/ipodclassic/, printed Oct. 26, 2007, 1 page.
"Jabber SoftwareFoundation," http://www.jabber.org/, copyright 1999-2005 the Jabber Software Foundation, printed Jan. 16, 2008, 3 pages.
"lavalife Where singles click," http://lavalife.com/, copyright 2006 Lavalife Corp., printed Jan. 16, 2008, 1 page.
"Dating Service—Singles, Personals and Love, Match.com," http://www.match.com/, copyright 2008 Match.com, printed Jan. 16, 2008, 2 pages.
"MySpace," http://www.myspace.com/, copyright 2003-2008 MySpace.com, printed Jan. 16, 2008, 2 pages.
"mobile community, free sms, mobile dating, text flirting and friends networking—playtxt . . . ," http://web.archive.org/web120070225125113rn_1/www.playtxt.net/playtxt.do, printed Janaury 16, 2008, 1 page.
"Rabble—Social networking for your phone," http://www.rabble.com/, copyright 2005-2008 Intercasting Corp, printed Jan. 16, 2008, 1 page.
"SmallPlanet: Home," http://web.archive.org/web/20061105030323/http://www.smallplanet.net/, copyright 2005 SmallPlanet.net, printed Jan. 16, 2008, 1 page.
"Yahoo! Messenger," http://messenger.yahoo.com/webmessengerpromo.php, copyright 2007 Yahoo! Inc., printed Oct. 26, 2007, 1 page.
"Yahoo! Personals," http://personals.yahoacom/us/homepage/splash, copyright 2008 Yahoo! Inc., printed Jan. 16, 2008, 2 pages.
"Zune," http://www.zune.net/en-US/, copyright 2008 Microsoft Corporation, printed Jan. 16, 2008, 1 page.
"Google AdWords: Regional and Local Targeting," https://adwords.google.com/select/targeting.html, copyright 2008 Google, printed Jul. 17, 2008, 1 page.
"Technology—Geo Targeting," http://www.invidi.com/pages/itc_technology_05.html, copyright 2007, printed Nov. 18, 2008, 1 page.
"IP Multimedia Subsystem," http://en.wikipedia.org/wiki/IP_Multimedia_Subsystem, printed Jul. 8, 2009, 11 pages.
"3GPP," Wikipedia, at <http://en.wikipedia.org/wiki/3GPP>, as revised Mar. 27, 2008, printed Dec. 12, 2011, 1 page.
"4G," Wikipedia, at <//en.wikipedia.org/wiki/4G>, as revised Apr. 23, 2008, printed Dec. 12, 2011, 1 page.
Blumentritt, C. W. et al., "TravTek system architecture evaluation," Jul. 1995, published by Federal Highway Administration, Springfield, VA: available through the National Technical Information Service, 1995, 251 pages.
"CEN/TC 278 Project Team 12 <<M 270 Phase 1>>: Standards for Road Transport and Traffic Telematics: Annexes," May 1999, published by Information & Communications Technologies (ICT) Standards Board, Intelligent Transport Systems Steering Group (ITSSG), printed Oct. 9, 2003, 48 pages.
Challe, Philippe, "CARMINAT—An Integrated Information and Guidance System," Vehicle Navigation & Information Systems Conference Proceedings, Oct. 20-23, 1991, pp. 137-145, published by IEEE, 11 pages.
Cowling, James, "Dynamic Location Management in Heterogeneous Cellular Networks," Thesis under Dr. Bjorn Landfeldt, Advanced Networks Research Group, School of Information Technologies, University of Sydney, Sydney, Australia, Oct. 2004, 155 pages.

Davies, Peter et al., "Standards for the Radio Data System—Traffic Message Channel," Future Transportation Technology Conference and Exposition, Aug. 7-10, 1989, Vancouver, British Columbia, Canada, pp. 105-115, published in the SAE Technical Paper Series, copyright 1989, Society of Automotive Engineers, Inc., 16 pages.

"Digital rights management," at <http://en.wikipedia.org/wiki/Digital_rights_management>, includes information dating back to 1998, page last modified Apr. 16, 2011, printed Apr. 21, 2011, 21 pages.

Dutta, et al., "MarconiNet supporting Streaming Media over Localized Wireless Multicast," International Workshop of Mobile E-Commerce, Sep. 28, 2002, Atlanta, Georgia, 9 pages.

Ely, S. R., "RDS-Alert: A Drive project to develop a proposed standard for the Traffic Message Channel feature of the Radio Data System RDS," IEE Colloquium on Car and its Environment—What Drive and Prometheus Have to Offer, Jan. 25, 1990, London, United Kingdom, pp. 8/1-8/6, published by IEEE, 7 pages.

Farradyne Systems, Inc., "Pathfinder Final Report—Draft—vol. I—Pathfinder System, prepared for: Federal Highway Administration," May 1, 1991, 51 pages.

Frank, Daniel L., "Information Systems: An Integral Part of Future Vehicles,"Proceedings of the Position Location and Navigation Symposium (PLANS '90), Mar. 20-23, 1990, Las Vegas, Nevada, pp. 52-55, published by IEEE, 5 pages.

Fukui, Ryotaro et al., "Individual Communication Function of RACS: Road Automobile Communication System," Vehicle Navigation and Information Systems Conference, Sep. 11-13, 1989, Toronto, Ontario, Canada, pp. 206-213, published by IEEE, 9 pages.

Gordon, Robert L., "Architectures for In-Vehicle Navigation Systems Displaying Real Time Traffic Condition Information," Vehicle Navigation & Information Systems Conference, Sep. 11-13, 1989, Toronto, Ontario, Canada, pp. 119-124, published by IEEE, 7 pages.

Ikeda, M. et al., "New Navigation System, MAPIX-III," Proceedings of the 16th ISATA, 16th International.Symposium on Automotive Technology & Automation with particular reference to automotive micro-electronics vehicle management systems and computer-aided testing, May 11-15, 1987, Florence, Italy, pp. 63-80, published by Automotive Automation, Ltd., Croydon, England, 19 pages.

"IPv6," Wikipedia, at <http://en.wikipedia.org/wiki/IPv6>, includes information that dates back to the early 1980s, page last modified Apr. 18, 2011, printed Apr. 21, 2011, 16 pages.

Krage, Mark K., "The TravTek Driver Information System," Vehicle Navigation and Information Systems Conference, Oct. 20-23, 1991, pp. 739-748, published by IEEE, 12 pages.

Kumar, Vijay, "Mobile Computing—Cellular Technology," Computer Science Department, University of Missouri—Kansas City, Kansas City, Missouri, date unknown, youngest reference is dated 2001, found at <http://k.web.umkc.edu/kumarv/cs572/cellular-technology.pdf>, 8 pages.

Mammano, F. et al, "Pathfinder System Design," Vehicle Navigation and Information Systems Conference, 1989, Conference Record, Sep. 11-13, 1989, Toronto, Ontario, Canada, pp. 484-488, published by IEEE, 6 pages.

Mammano, Frank J. et al., "Pathfinder Status and Implementation Experience," Vehicle Navigation and Information Systems Conference, 1991, Oct. 20-23, 1991, pp. 407-413, published by IEEE, 9 pages.

Markowetz, A. et al., "Design and Implementation of a Geographic Search Engine," Eighth International Workshop on the Web and Databases (WebDB 2005), Jun. 16-17, 2005, Baltimore, Maryland, at <http://cis.poly.edu/suel/papers/geo.pdf>, 6 pages.

"Multicast," Wikipedia, at <http://en.wikipedia.org/wiki/Multicast>, includes information that dates back to 2005, page last modified Mar. 26, 2011, printed Apr. 21, 2011, 5 pages.

Rillings, James H. et al., "TravTek," Vehicle Navigation and Information Systems Conference, Oct. 1991, Warrandale, Pennsylvania, published Oct. 1, 1991, pp. 729-737, published by Society of Automotive Engineers, Inc., Warrendale, Pennsylvania, 10 pages.

Scrase, Adrian, "Overview of the Current Status of 3GPP LTE," Presentation Slides, ETSI, World Class Standards, Mobile World Congress, Feb. 11-14, 2008, Barcelona, Spain, 20 pages.

"Service Guide for Mobile Broadcast Services," Candidate Version 1.0, Feb. 26, 2008, Open Mobile Alliance, copyright 2008, Open Mobile Alliance Ltd., found at <http://www.openmobilealliance.org/Technical/release_program/docs/BCAST/V1_0-20080226-C/OMA-TS-BCAST_Service_Guide-V1_0-20080226-C.pdf>, printed Apr. 18, 2011, pp. 1-217.

Shibano, Yoshizo et al., "Development of Mobile Communication System for RACS," Vehicle Navigation and Information Systems Conference, Sep. 11-13, 1989, Toronto, Ontario, Canada, Conference Record, pp. 376-383, published by IEEE, 9 pages.

Thoone, Martin L. G. et al., "Application of the Compact Disc in Car Information and Navigation Systems," SAE Technical Paper Series, International Congress & Exposition, Feb. 1, 1984, pp. 105-111, published by Sae International, 8 pages.

Tsuzawa, M. et al., "Advanced Mobile Traffic Information and Communication System—AMTICS," Vehicle Navigation and Information Systems Conference, 1989, Conference Record, Sep. 11-13, 1989, Toronto, Ontario, Canada, pp. 475-483, published by IEEE, 10 pages.

Weld, Robert B., "Communications Flow Considerations in Vehicle Navigation and Information Systems," Vehicle Navigation and Information Systems Conference, Sep. 11-13, 1989, Toronto, Ontario, Canada, Conference Record, pp. 373-375, published by IEEE, 4 pages.

* cited by examiner

| POINT | INTERSECTING SHAPES | KEYWORDS |
|---|---|---|
| 18 | A | RED=80, BLUE=30 |
| 20 | A,B | RED=80, BLUE=30, WHITE=50 |
| 22 | A,B,C,D | RED=20, BLUE=90, WHITE=50, GREEN=10 |
| 24 | A,C,D | RED=20, BLUE=90, GREEN=10 |

| SHAPE | Z-ORDER | KEYWORDS |
|---|---|---|
| 26 | 0 | Change = 80, NAFTA = 30, election = 100, experience = 20 |
| 28 | 1 | job loss = 50, trade deficit |
| 30 | 2 | Iraq = 90, oil prices = 70 |
| 32 | 0 | Change = 80, NAFTA = 30, election = 100, experience = 20 |
| 34 | 1 | trade deficit = 80 |
| 36 | 2 | Iraq = 90 |
| 38 | 3 | job loss = 50 |
| 40 | 4 | oil prices = 70 |

*FIG. 4C*

| POINT | INTERSECTING SHAPES | KEYWORDS | BID |
|---|---|---|---|
| 42 | 26, 28 | Change = 80, NAFTA = 30, election = 100, experience = 20, job loss = 50, trade deficit = 25 | 305 |
| 44 | 32, 34 | Change = 80, NAFTA = 30, election = 100, experience = 20, trade deficit = 80 | 310 |

*FIG. 4D*

| SHAPE | Z-ORDER | KEYWORDS |
|---|---|---|
| 46 | 0 | Rock = 80, Country = 30, Pop = 30 |
| 48 | 1 | Alternative = 50 |
| 50 | 2 | Polka = 200 |
| 52 | 3 | Rap = 80 |
| 54 | 4 | Jazz = 10 |
| 56 | 5 | Beach = 95 |

| POINT | INTERSECTING SHAPES | KEYWORDS |
|---|---|---|
| 58 | 46, 54 | Rock = 80, Country = 30, Pop = 30, Jazz = 10 |

CUSTOMIZED CONTENT DELIVERY THROUGH THE USE OF ARBITRARY GEOGRAPHIC SHAPES

FIELD OF THE INVENTION

The present invention relates to customized content delivery based on location.

BACKGROUND OF THE INVENTION

Services such as Google® AdWords enable advertisers to target advertisements based on keywords entered for an Internet search request. Such services have achieved enormous success. However, even with such success, there is a need for an improved advertisement delivery system.

SUMMARY OF THE INVENTION

The present invention relates to providing customized content to users based on their location. In one embodiment, for each of one or more content providers, a central custom content delivery function obtains information defining one or more tags assigned to each of a number of content items provided by the content provider. Each content item may be an advertisement such as a text-based or video advertisement, a media item such as an audio item or video item, or the like. Each tag may be, for example, a keyword, a demographic criterion, or the like. For each content provider, the central custom content delivery function also receives information from the content provider defining a number of geographic shapes selecting corresponding geographic areas. For each geographic shape, the content provider defines one or more tags for the geographic shape, or the geographic area selected by the geographic shape, and assigns a weight to each of the one or more tags. Like the tags assigned to the content items of the content provider, the tags assigned to the geographic shapes defined by the content provider may each be, for example, a keyword, a demographic criterion, or the like. Thereafter, when a request is received from a requestor, one or more of the content items of one or more of the content providers are selected for delivery to the requester based on the geographic shapes defined by the one or more content providers, the tags and corresponding weights for the geographic shapes defined by the one or more content providers, and the location of the requestor.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a flow chart illustrating a process for delivering customized content, or data, based on the location of a requester according to one embodiment of the present invention;

FIG. 2A graphically illustrates a number of geographic shapes defined by a content provider as well as keywords and corresponding weights assigned to the geographic shapes defined by the content provider according to one embodiment of the present invention;

Figure 1:
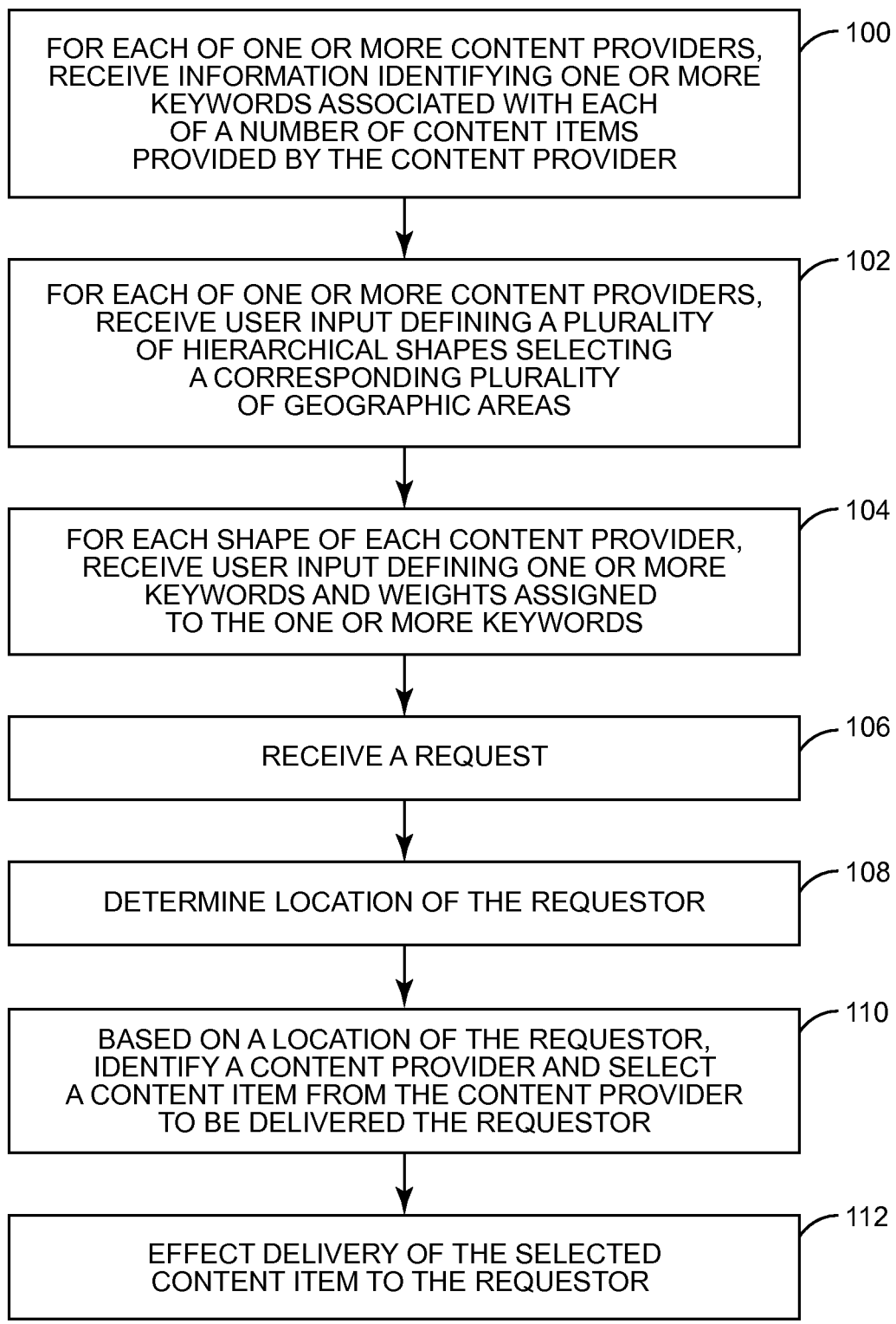
Figure 3:
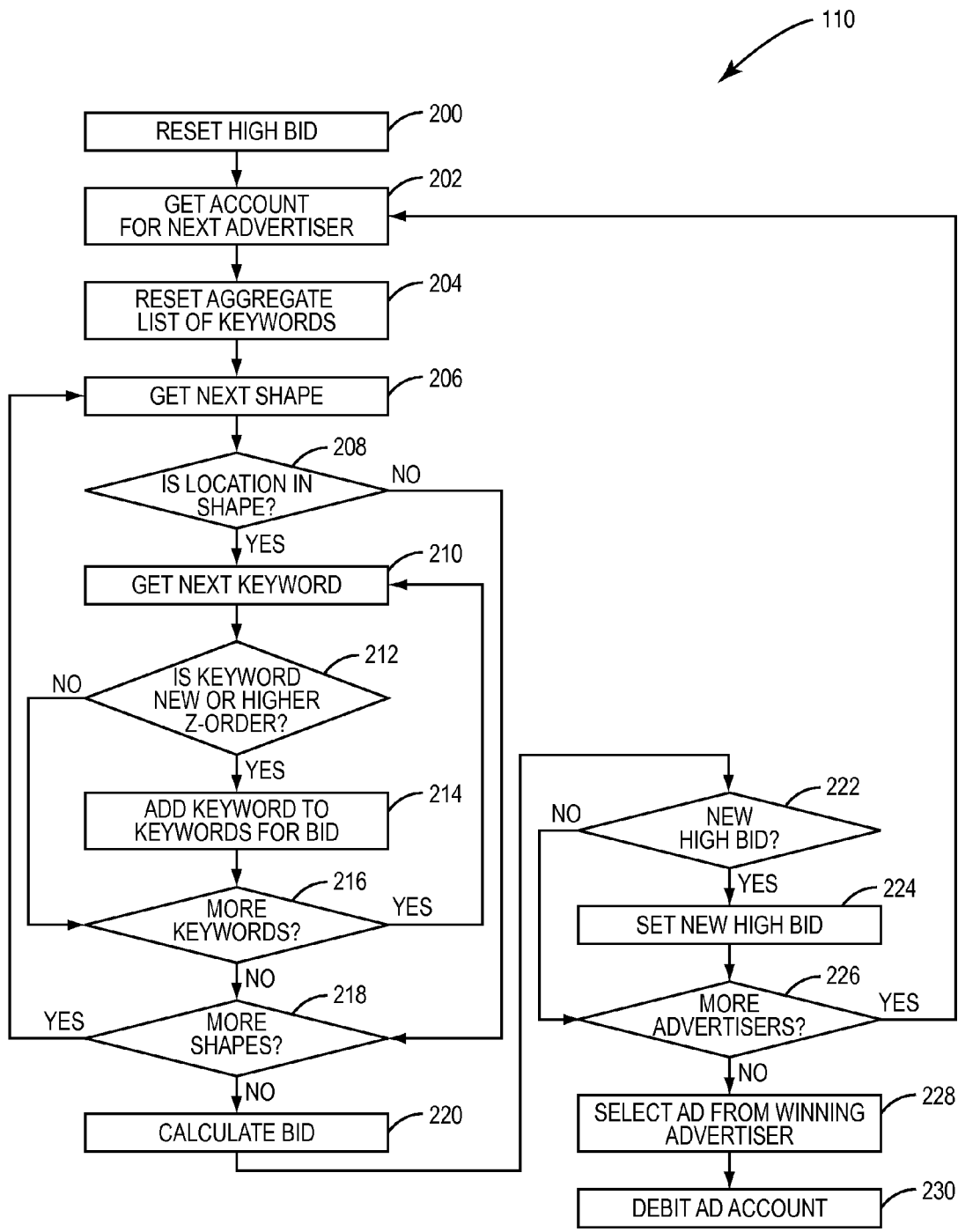
FIG. 3 is a more detailed flow chart of the step of selecting a content item to deliver to a requestor based on the location of the requestor from FIG. 1 according to one embodiment of the present invention.
Figure 5:
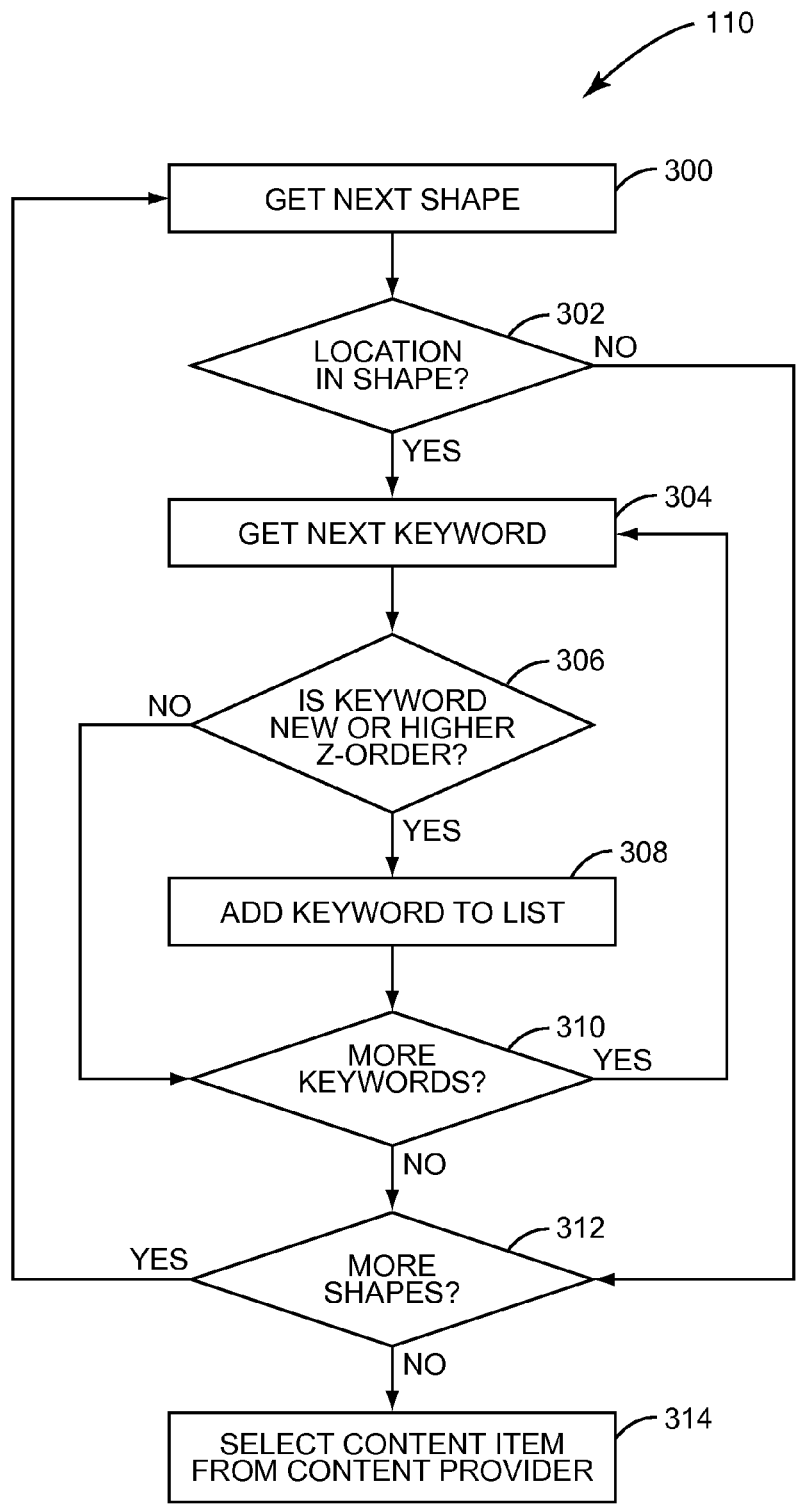
Figures 6A, 6B, 6C:
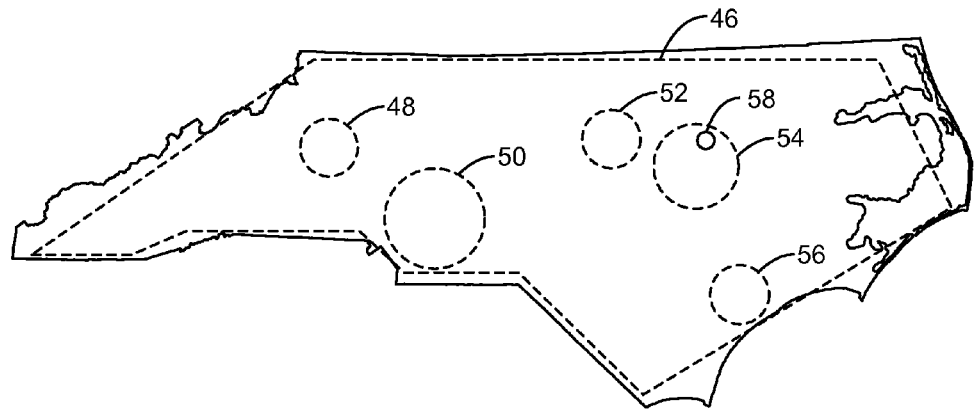
Figure 7A:
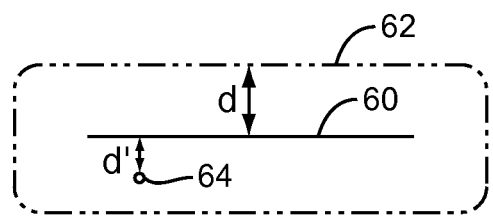
Figure 7B:
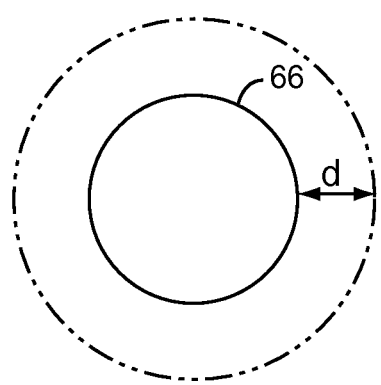
Figure 8:
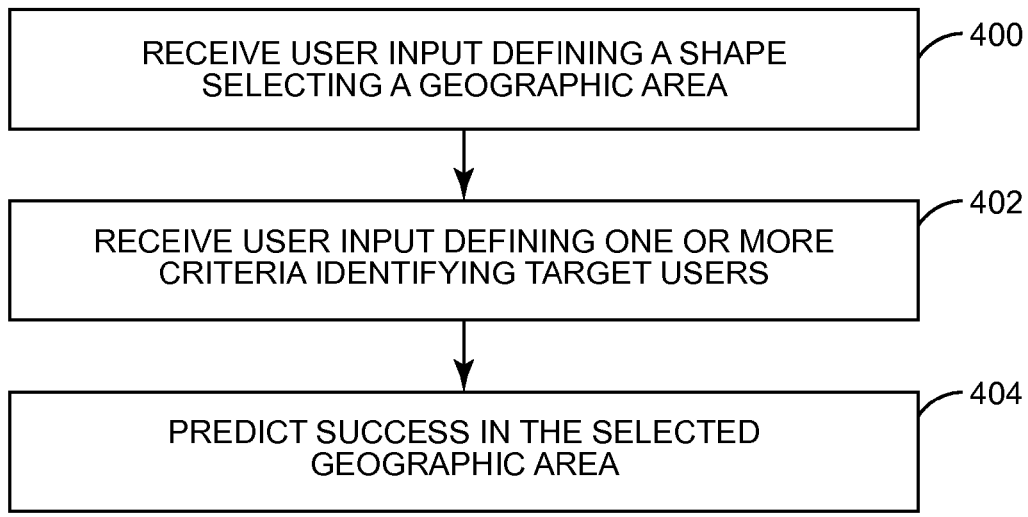
Figure 9:
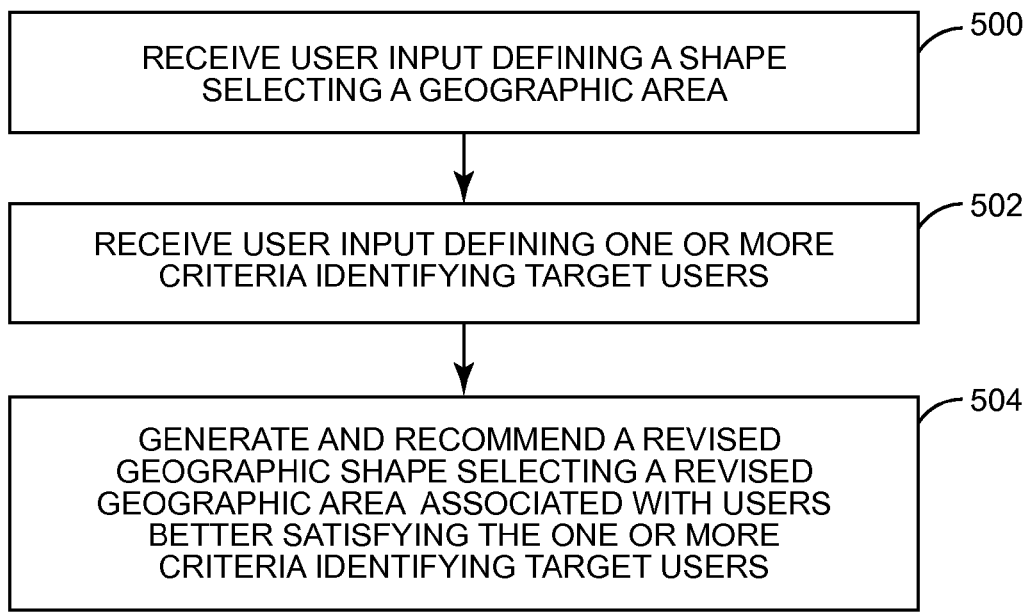
Figure 11:
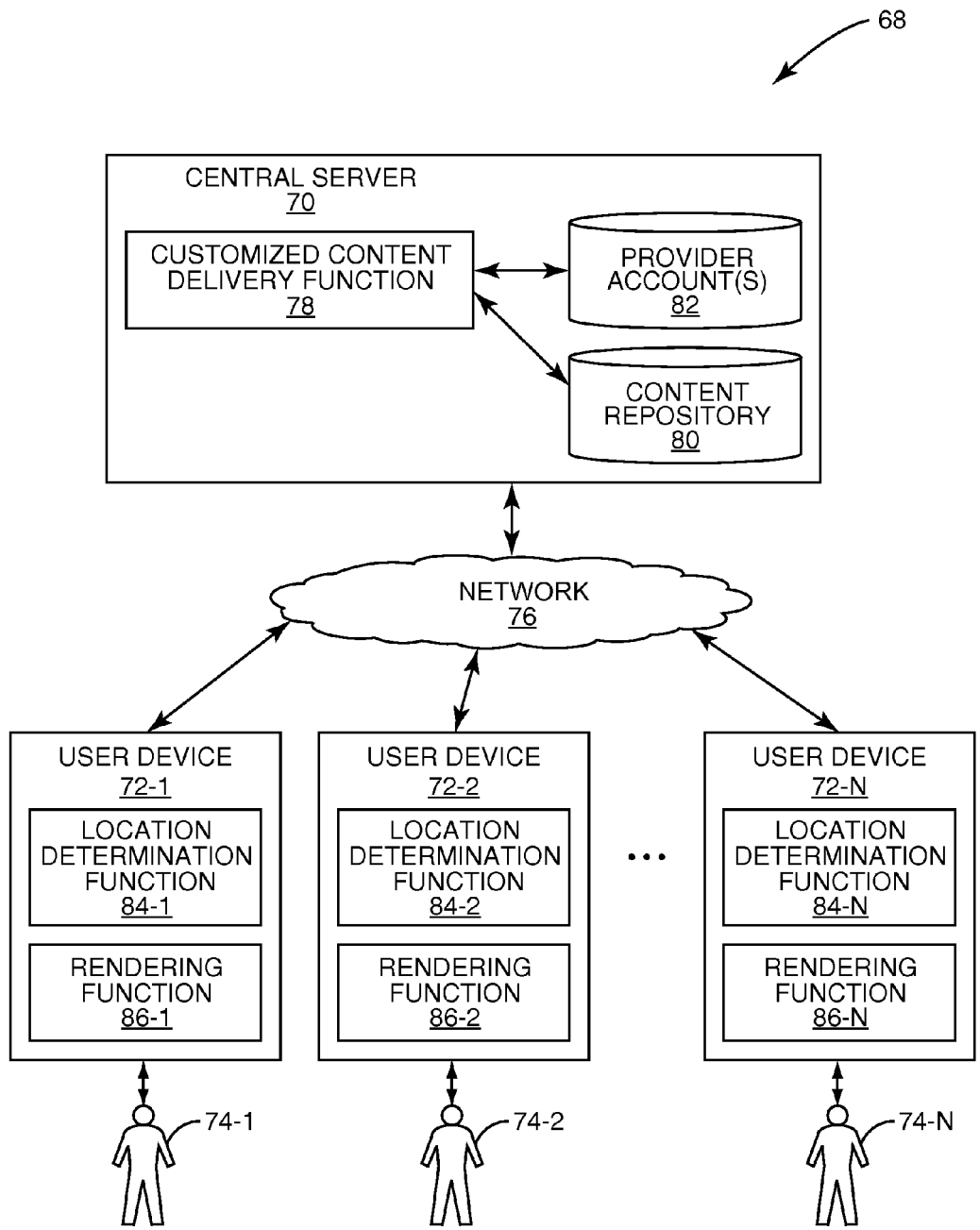
Figure 12:
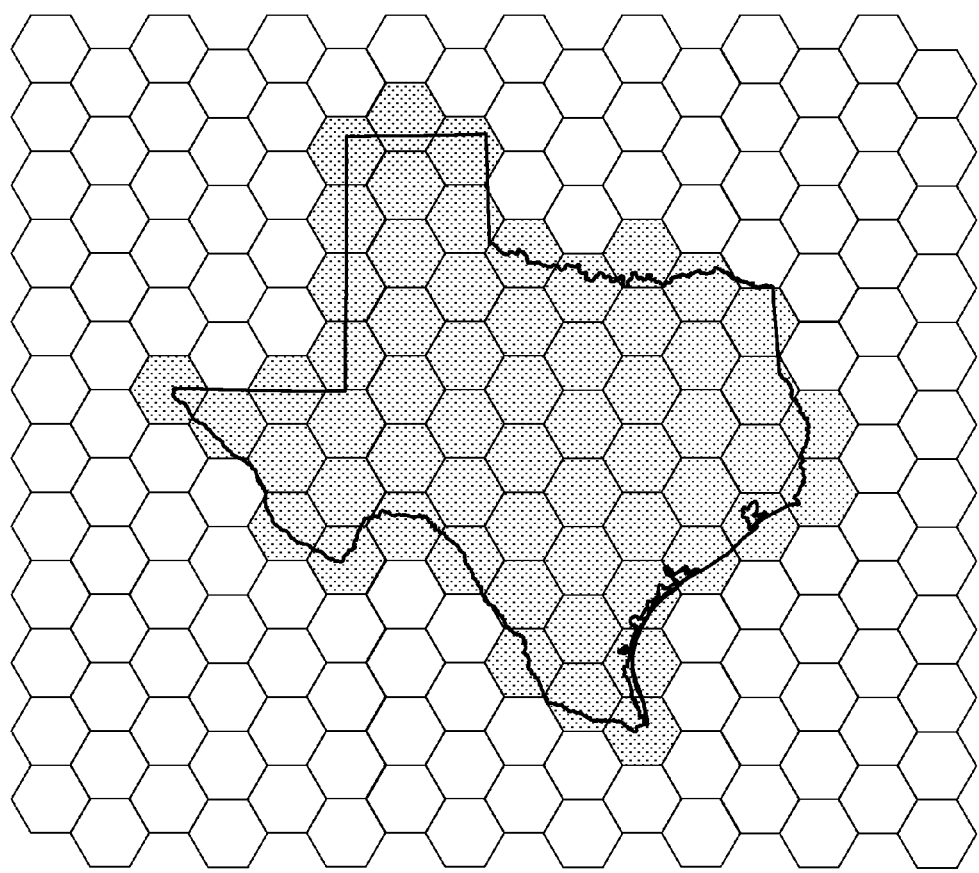
Figure 13:
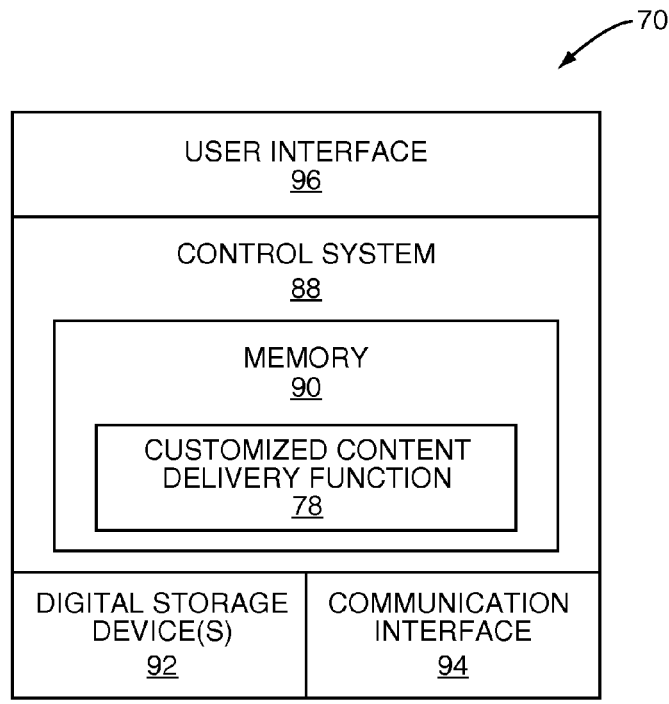
Figure 14:
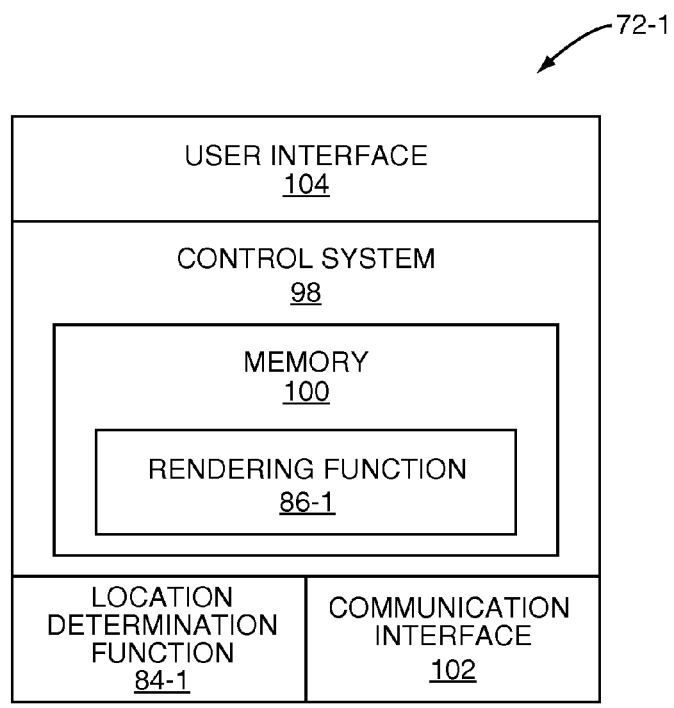

FIGS. 4A through 4D graphically illustrate the process of FIG. 3 for one content provider according to an exemplary embodiment of the present invention;

FIG. 5 is a more detailed flow chart of the step of selecting a content item to deliver to a requestor based on the location of the requestor from FIG. 1 according to another embodiment of the present invention;

FIGS. 6A through 6C graphically illustrate the process of FIG. 5 according to an exemplary embodiment of the present invention;

FIGS. 7A and 7B graphically illustrate a process for utilizing a damping factor in association with exemplary geographic shapes defined by a content provider according to one embodiment of the present invention;

FIG. 8 illustrates a process for predicting the success of a content provider with respect to a geographic area selected by a geographic shape defined by the content provider according to one embodiment of the present invention;

FIG. 9 illustrates a process for recommending a revised geographic shape to a content provider according to one embodiment of the present invention;

FIGS. 10A through 10D graphically illustrate a process for predicting success and recommending a revised geographic shape according to the process of FIGS. 8 and 9;

FIG. 11 illustrates a system for delivering customized content, or data, based on the location of a requestor according to one embodiment of the present invention;

FIG. 12 illustrates an exemplary scheme for segmenting a geographic area according to one embodiment of the present invention;

FIG. 13 is a block diagram of the central server of FIG. 11 according to one embodiment of the present invention; and FIG. 14 is a block diagram of one of the user devices of FIG. 11 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 is a flow chart illustrating a process for delivering customized content, or data, based on the location of a requestor according to one embodiment of the present invention. First, for each of one or more content providers, information identifying one or more keywords associated with each of a number of content items provided by the content provider is received or otherwise obtained (step 100). Thus, for each content item for each content provider, one or more keywords associated with that content item are defined. As used herein, a content provider may be an advertiser or a media content provider. Similarly, as used herein, a content item may be an advertisement such as, but not limited to, a text-based advertisement, an audio advertisement, or a video advertisement; a media item such as, but not limited to, an audio item such as a song, audio book, or audio clip or a video item such as a movie, television program, or video clip; or the like.

In addition, for each content provider, information defining a number of geographic shapes selecting corresponding geographic areas is received from the content provider (step 102). Preferably, the geographic shapes are user-defined shapes defined by a user associated with the content provider. For example, a user associated with a content provider may provide a center point and radius defining a circle that selects a desired geographic area; four points defining a square or rectangular shape that selects a desired geographic area; a number of points, curves, or lines defining an arbitrary shape that selects a desired geographic area; or the like. As another example, the user may provide a line or curve and a distance (d) defining a shape selecting a geographic area within the distance (d) from the line or curve. Preferably, each of the geographic shapes defined by a content provider completely or partially overlaps at least one other of the geographic shapes. In addition, the geographic shapes defined for a content provider are preferably hierarchical in that the geographic shapes are assigned importance levels, which are referred to herein as z-order values. For each geographic shape of each content provider, information is received from the content provider defining one or more keywords and corresponding weights assigned to the geographic shape (step 104).

Figures 2A, 2B:
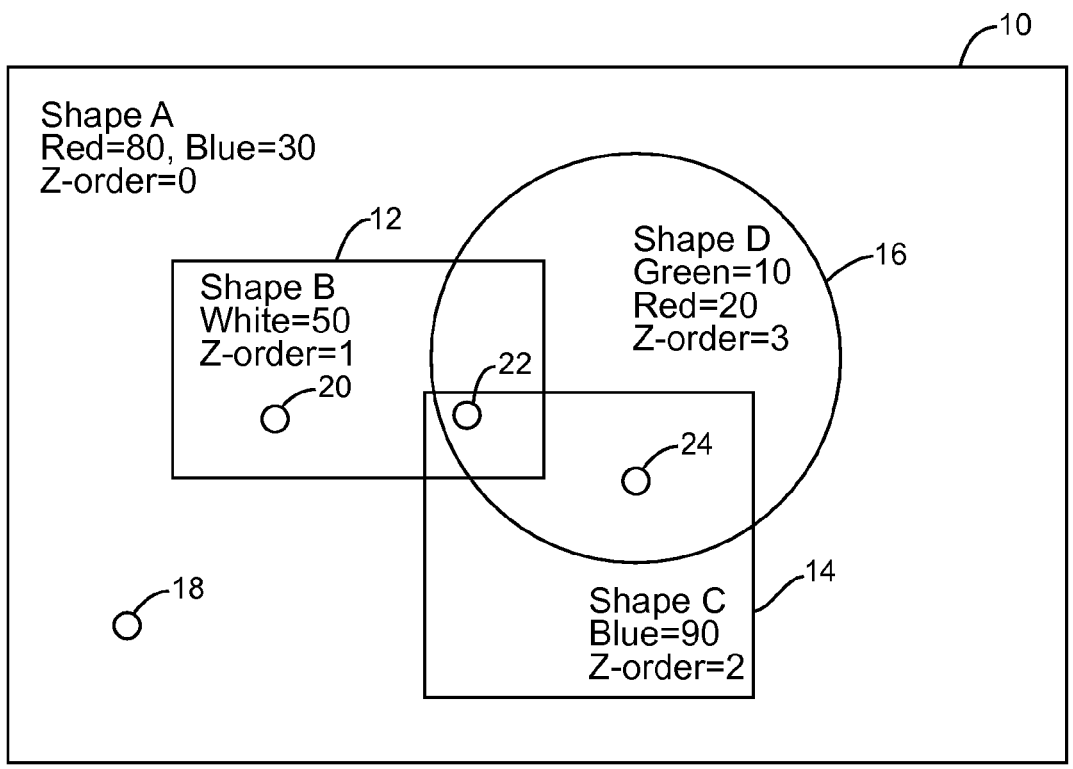
FIG. 2B illustrates an aggregate list of keywords generated in response to requests from each of a number of locations within the geographical shapes of FIG. 2A according to one embodiment of the present invention.

As an example, FIG. 2A illustrates exemplary geographic shapes 10 through 16 defined by a content provider according to one embodiment of the present invention. While not shown, the geographic shapes 10 through 16 are combined with or overlaid upon a map or similar data structure to identify the corresponding geographic areas. Each one of the geographic shapes 10 through 16 overlaps or intersects at least one other one of the geographic shapes 10 through 16, and each one of the geographic shapes 10 through 16 is assigned an importance level, or z-order value. In this example, the content provider has assigned the keyword Red with a weight of 80 and the keyword Blue with a weight of 30 to the geographic shape 10, which is also referred to as Shape A. In other words, the content provider has tagged the geographic shape 10 with the keywords Red and Blue. The content provider has assigned the geographic shape 10 a z-order value of 0, thereby setting the geographic shape 10 to a lowest importance level. Likewise, the content provider has assigned the keyword White with a weight of 50 to the geographic shape 12, which is also referred to herein as Shape B, and assigned the geographic shape 12 a z-order value of 1. The content provider has assigned the keyword Blue with a weight of 90 to the geographic shape 14, which is also referred to herein as Shape C, and assigned the geographic shape 14 a z-order value of 2. Lastly, the content provider has assigned the keyword Green with a weight of 10 and the keyword Red with a weight of 20 to the geographic shape 16, which is also referred to herein as Shape D, and assigned the geographic shape 16 a z-order value of 3.

Returning to FIG. 1, at some point in time after the content providers have defined their geographic shapes and assigned keywords and corresponding weights to their geographic shapes, a request is received from a requestor (step 106). The requestor may be a requesting user such as, for example, a user associated with a user device such as a personal computer, set-top box, mobile smart phone, or the like. Alternatively, the requester may be a device or system such as, for example, a personal computer, set-top box, mobile smart phone, cable television headend, or the like. The request may be a specific request for content or a request that triggers the selection and delivery of content to the requestor. For example, in one embodiment, the request is an Internet search request including a number of keywords entered by a requesting user as search terms. In another embodiment, the request is a specific request for content. For example, the request may be a request for one or more advertisements issued by a cable television headend, a set-top box associated with a customer of a cable television service, or the like, where the advertisement(s) delivered in response to the request may be inserted to television content at the cable television headend or set-top box in a late-binding process. Note that these two examples are for illustrative purposes and are not intended to limit the scope of the present invention. Numerous variations will be apparent to one of ordinary skill in the art upon reading this disclosure and are to be considered within the scope of the present invention.

In response to the request, a location of the requestor is determined (step 108). Numerous schemes may be used to determine the location of the requestor. For example, the request may be issued from a location-aware device such as, but not limited to, a mobile smart phone. The mobile smart phone may obtain its location from an associated Global Positioning System (GPS) receiver, from the mobile telecommunications network which determines the location of the mobile smart phone using a technique such as triangulation, or the like. Then, whether the requester is the user of the location-aware device or the location-aware device itself, the location of the location-aware device may be provided in association with the request and utilized as the location of the requestor. As another example, the request may include an Internet Protocol (IP) address of a device issuing the request. Using known techniques, the location of the requestor may then be determined based on the IP address of the device issuing the request. Again, these examples are for illustrative purposes and are not intended to limit the scope of the present invention. Numerous techniques for determining the location of the requestor will be apparent to one of ordinary skill in the art upon reading this disclosure and are to be considered within the scope of the present invention.

Then, based on the location of the requestor and the geographic shapes defined by the one or more content providers, a content provider is selected if necessary, and one or more content items of the content provider are selected for delivery to the requestor (step 110). Once selected, the one or more content items are delivered or caused to be delivered to the requester (step 112). As an example, returning to FIG. 2A, if the requestor is located at point 18, then, as shown in FIG. 2B, the requestor is located within the geographic shape 10 (Shape A) of this particular content provider. As such, the keywords and corresponding weights for the geographic shape 10 (Shape A) may then be utilized to select one or more content items of the corresponding content provider to deliver to the requestor. Note that if there are multiple content providers and the requester is located within geographic shapes of two or more content providers, one of the content providers is preferably selected as the content provider for which content is to be delivered to the requestor. An exemplary scheme for selecting the content provider from multiple content providers is discussed below with respect to FIG. 3.

In contrast, if the requestor is located at point 20, then the requestor is located within the geographic shapes 10 and 12 (Shapes A and B). As such, as illustrated in FIG. 2B, the keywords and weights for the two geographic shapes 10 and 12 are aggregated to provide a list of keywords and corresponding weights to be used to select one or more content items to be delivered to the requestor. For this example, the aggregate list of keywords and corresponding weights is Red with a weight of 80, Blue with a weight of 30, and White with a weight of 50. This aggregate list of keywords and corresponding weights may then be utilized to select content items of the corresponding content provider to be delivered to the requestor.

If instead requestor is located at point 22, then the requestor is located within the geographic shapes 10 through 16 (Shapes A, B, C, and D). As such, as illustrated in FIG. 2B, the keywords and weights for the geographic shapes 10 through 16 are aggregated according to the z-order values of the geographic shapes 10 through 16 to provide an aggregate list of keywords and corresponding weights to be used to select one or more content items to be delivered to the requester. Note that, in this case, the keyword Red is assigned to both the geographic shape 10 (Shape A) and the geographic shape 16 (Shape D). However, the weight assigned to the keyword Red is 80 in the geographic shape 10 (Shape A) and 20 in the geographic shape 16 (Shape D). Since the z-order value, or importance level, assigned to the geographic shape 16 (Shape D) is higher than that assigned to the geographic shape 10 (Shape A), the weight assigned to the keyword Red in the geographic shape 16 (Shape D) overrides the weight assigned to the keyword Red in the geographic shape 10 (Shape A). Similarly, the keyword Blue is assigned to both the geographic shape 10 (Shape A) and the geographic shape 14 (Shape C). However, the weight assigned to the keyword Blue is 30 in the geographic shape 10 (Shape A) and 90 in the geographic shape 14 (Shape C). Since the z-order value, or importance level, assigned to the geographic shape 14 (Shape C) is higher than that assigned to the geographic shape 10 (Shape A), the weight assigned to the keyword Blue in the geographic shape 14 (Shape C) overrides the weight assigned to the keyword Blue in the geographic shape 10 (Shape A). Thus, the aggregate list of keywords and corresponding weights for the requestor located at point 22 is Red with a weight of 20, Blue with a weight of 90, White with a weight of 50, and Green with a weight of 10. This aggregate list of keywords and corresponding weights may then be utilized to select content items of the corresponding content provider to be delivered to the requester.

Lastly, if the requestor is located at point 24, then the requestor is located within the geographic shapes 10, 14 and 16 (Shapes A, C, and D). As such, as illustrated in FIG. 2B, the keywords and weights for the geographic shapes 10, 14 and 16 are aggregated to provide an aggregate list of keywords and corresponding weights to be used to select one or more content items to be delivered to the requestor. Again, in this case, the keyword Red is assigned to both the geographic shape 10 (Shape A) and the geographic shape 16 (Shape D). However, the weight assigned to the keyword Red is 80 in the geographic shape 10 (Shape A) and 20 in the geographic shape 16 (Shape D). Since the z-order value, or importance level, assigned to the geographic shape 16 (Shape D) is higher than that assigned to the geographic shape 10 (Shape A), the weight assigned to the keyword Red in the geographic shape 16 (Shape D) overrides the weight assigned to the keyword Red in the geographic shape 10 (Shape A). Similarly, the keyword Blue is assigned to both the geographic shape 10 (Shape A) and the geographic shape 14 (Shape C). However, the weight assigned to the keyword Blue is 30 in the geographic shape 10 (Shape A) and 90 in the geographic shape 14 (Shape C). Since the z-order value, or importance level, assigned to the geographic shape 14 (Shape C) is higher than that assigned to the geographic shape 10 (Shape A), the weight assigned to the keyword Blue in the geographic shape 14 (Shape C) overrides the weight assigned to the keyword Blue in the geographic shape 10 (Shape A). Thus, the aggregate list of keywords and corresponding weights for the requestor located at point 24 is Red with a weight of 20, Blue with a weight of 90, and Green with a weight of 10. This aggregate list of keywords and corresponding weights may then be utilized to select content items of the corresponding content provider to be delivered to the requestor.

FIG. 3 is a more detailed illustration of step 110 of FIG. 1 according to one embodiment of the present invention. In this example, the one or more content providers are advertisers. However, again, the present invention is not limited thereto. First, a high bid is reset (step 200). Then, an account is obtained for a next advertiser (step 202). For the first iteration, the next advertiser is the first advertiser. The account of the advertiser includes information identifying the geographic shapes defined by the advertiser, the keywords and corresponding weights assigned to each of the geographic shapes, and the keywords assigned to the content items of the advertiser, which in this example are advertisements. Next, an aggregate list of keywords and corresponding weights for the advertiser is reset (step 204).

A next geographic shape for the advertiser is then obtained from the account of the advertiser (step 206). For the first iteration, the next geographic shape is the first geographic shape for the advertiser. Next, a determination is made as to whether the requestor is located within the geographic shape or, more specifically, the geographic area selected by the geographic shape (step 208). If not, the process proceeds to step 218. Otherwise, a next keyword assigned to the geographic shape is obtained from the account of the advertiser (step 210). For the first iteration, the next keyword is the first keyword. Then, a determination is made as to whether the keyword is new or has a higher z-order than another instance of the keyword already included in the aggregate list of keywords for the advertiser (step 212).

More specifically, a determination is made as to whether the keyword is already in the aggregate list of keywords for the advertiser. If the keyword is not already in the aggregate list of keywords for the advertiser, the process proceeds to step 214. If the keyword is already in the aggregate list for the advertiser, then the keyword is said to conflict with the instance of the keyword in the aggregate list. Note that a conflict may also exist if the keyword and another keyword in the aggregate list are mutually exclusive. Mutually exclusive keywords may be known by the system or defined by the advertiser. A determination is then made as to whether the current geographic shape has a higher z-order, or importance level, than the geographic shape for the instance of the keyword that is already in the aggregate list. If the current geographic shape does not have a higher z-order, the process proceeds to step 216. If the current geographic shape has a higher z-order, then the process proceeds to step 214. At this point, the keyword and corresponding weight assigned to the keyword for the geographic shape are added to the aggregate list for the advertiser (step 214). Note that in the case where a previous instance of the keyword for a geographic shape having a lower z-order is in the aggregate list, the previous instance of the keyword is replaced by the keyword and corresponding weight for the current geographic shape.

Note that in one embodiment, the request from the requestor includes a number of keywords. This may be the case when, for example, the request is an Internet search request including a number of keyword search terms. If the request includes a number of keywords, then, in this embodiment, the keyword assigned to the geographic shape may be added to the aggregate list only if it matches a keyword in the request and is either a new keyword for the aggregate list or is to replace a previous instance of the keyword in the aggregate list associated with a geographic shape of the advertiser having a lower z-order, or importance level.

At this point whether proceeding from step 212 or step 214, a determination is made as to whether there are more keywords assigned to the geographic shape (step 216). If so, steps 210 through 216 are repeated until all of the keywords assigned to the geographic shape have been processed. Once all of the keywords for the geographic shape have been processed, a determination is made as to whether there are more geographic shapes for the advertiser (step 218). If so, steps 206 through 218 are repeated until all of the geographic shapes for the advertiser have been processed. At that point, a bid for the advertiser is calculated based on the aggregate list of keywords for the advertiser generated in steps 206 through 218 (step 220). More specifically, in one embodiment, the bid for the advertiser is a sum of the weights of the keywords in the aggregate list of keywords. However, the present invention is not limited thereto. A determination is then made as to whether the bid for the advertiser is greater than the previous high bid (step 222). If not, the process proceeds to step 226. If so, the bid for the advertiser is set as the new high bid (step 224).

At this point, whether proceeding from step 222 or step 224, a determination is made as to whether there are more advertisers (step 226). If so, steps 202 through 226 are repeated until all advertisers have been processed. Once all of the advertisers have been processed, one or more advertisements of the advertiser having the highest bid are selected based on the aggregate list of the keywords for that advertiser (step 228). More specifically, in one embodiment, each of the advertisements of the advertiser having the highest bid may be scored as a function of the keywords in the aggregate list of keywords and the corresponding weights for the advertiser as compared to the keywords assigned to the advertisements of the advertiser. One or more advertisements having the highest score(s) may then be selected as advertisements to be delivered to the requestor. Once the advertisements are selected, the account of the advertiser may then be debited based on a predefined fee (step 230).

Figure 4A:
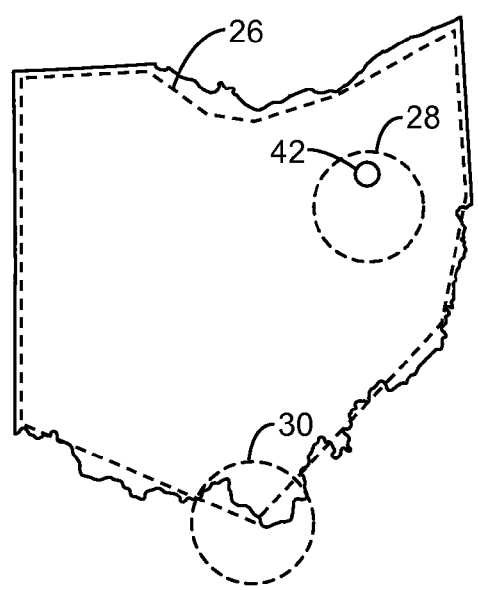
Figure 4B:
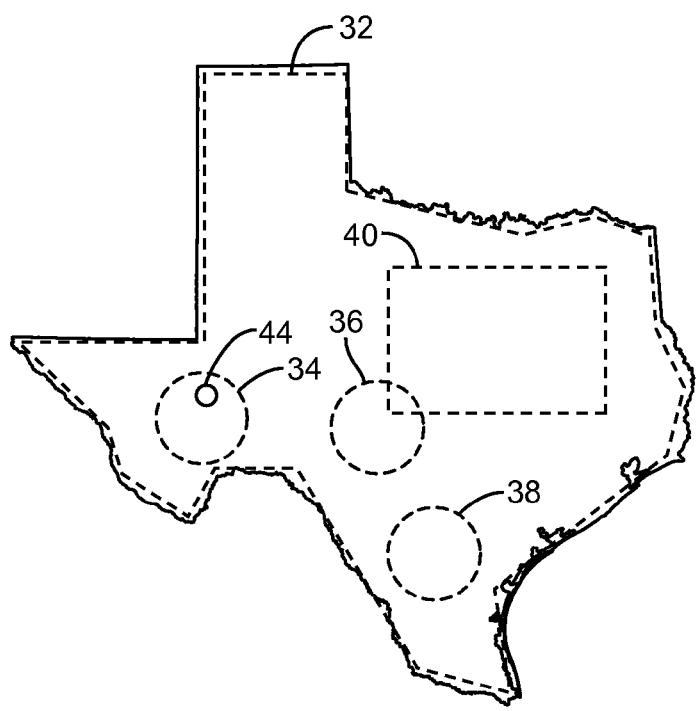

FIGS. 4A through 4D graphically illustrate the process of FIG. 3 with respect to one advertiser according to one embodiment of the present invention. FIGS. 4A and 4B illustrate geographic shapes defined by the advertiser to select geographic areas of interest to the advertiser. More specifically, as illustrated in FIG. 4A, the advertiser has defined a geographic shape 26 selecting the state of Ohio, a geographic shape 28 selecting a geographic area within the state of Ohio, and a geographic shape 30 selecting a geographic area including part of the state of Ohio as well as part of the states of Kentucky and West Virginia (not shown). In addition, as illustrated in FIG. 4B, the advertiser has defined a geographic shape 32 selecting the state of Texas and geographic shapes 34 through 40 selecting corresponding geographic areas within the state of Texas. FIG. 4C illustrates keywords and corresponding weights assigned by the advertiser to each of the geographic areas 26 through 40 shown in FIGS. 4A and 4B. Note that keywords, such as the keyword "trade deficit" assigned to the geographic shape 28, that have not been assigned a weight by the advertiser may be assigned a default weight. The default weight may be a user-defined value or a system-defined value. In this example, the default weight is 25.

FIG. 4D illustrates aggregate lists of keywords and corresponding weights as well as bid values generated using the process of FIG. 3 for two requests. A request is received from a first requestor located at point 42 (FIG. 4A). As such, the requestor is located within the geographic shapes 26 and 28. Therefore, using the process of FIG. 3, the keywords assigned to the geographic shapes 26 and 28 are aggregated to provide the aggregate list of keywords shown for the point 42 shown in FIG. 4D. This aggregate list includes the keyword Change with a weight of 80, the keyword NAFTA with a weight of 30, the keyword Election with a weight of 100, the keyword Experience with a weight of 20, the keyword Job Loss with a weight of 50, and the keyword Trade Deficit with a weight of 25. The bid for the advertiser in response to the request from the requester located at the point 42 may then be calculated by summing the weights for the keywords in the aggregate list. Using this bid calculation scheme, in this example, the bid for the requester located at the point 42 is 305. As discussed above, if there are multiple advertisers having geographic shapes within which the point 42 is located, then a bid for each of the advertisers may be calculated in this manner. The advertiser having the highest bid may then be selected as the advertiser from which advertisements are selected to be delivered to the requester located at the point 42.

In this example, a request is also received from a second requester located at point 44 (FIG. 4B). As such, the requestor is located within the geographic shapes 32 and 34. Therefore, using the process of FIG. 3, the keywords assigned to the geographic shapes 32 and 34 are aggregated to provide the aggregate list of keywords shown for the point 44 in FIG. 4D. This aggregate list includes the keyword Change with a weight of 80, the keyword NAFTA with a weight of 30, the keyword Election with a weight of 100, the keyword Experience with a weight of 20, and the keyword Trade Deficit with a weight of 80. Note that since the keyword Trade Deficit is assigned to both of the geographic shapes 32 and 34 and the geographic shape 34 has a higher z-order, or importance level, than the geographic shape 32, the weight assigned to the keyword Trade Deficit for the geographic shape 34 overrides the weight assigned to the keyword Trade Deficit for the geographic shape 32. The bid for the advertiser for the requestor located at the point 44 may then be calculated by summing the weights for the keywords in the aggregate list. Using this bid calculation scheme, in this example, the bid for the requester located at the point 44 is 310. As discussed above, if there are multiple advertisers having geographic shapes within which the point 44 is located, then a bid for each of the advertisers may be calculated in this manner. The advertiser having the highest bid may then be selected as the advertiser from which advertisements are selected to be delivered to the requester located at the point 44. Note that while the process of FIG. 3 and the examples of FIGS. 4A through 4D focus on advertisements, the present invention is not limited thereto. The process of FIG. 3 may be utilized in any embodiment where there may be multiple content providers that have defined geographic shapes within which the requestor is located.

FIG. 5 is a more detailed illustration of step 110 of FIG. 1 according to another embodiment of the present invention. In this embodiment, there is only one content provider. However, this process is equally applicable to an embodiment where there are multiple content providers. If there are multiple content providers, content from each content provider having defined a geographic shape in which the requestor is located may be selected and delivered to the requestor.

First, a next geographic shape for the content provider is obtained (step 300). For the first iteration, the next geographic shape is the first geographic shape for the content provider. A determination is then made as to whether the requestor is located within the geographic shape or, more specifically, the geographic area selected by the geographic shape (step 302). If not, the process proceeds to step 312. Otherwise, a next keyword assigned to the geographic shape by the content provider is obtained (step 304). For the first iteration, the next keyword is the first keyword. Then, a determination is made as to whether the keyword is new or has a higher z-order than another instance of the keyword already included in an aggregate list of keywords for the content provider (step 306). If the keyword is not already in the aggregate list of keywords for the content provider, the process proceeds to step 308. If the keyword is already in the aggregate list for the content provider, then a determination is made as to whether the current geographic shape has a higher z-order, or importance level, than the geographic shape for the instance of the keyword that is already in the aggregate list. If the current geographic shape does not have a higher z-order, the process proceeds to step 310. If the current geographic shape has a higher z-order, then the process proceeds to step 308. At this point, the keyword and corresponding weight assigned to the keyword for the geographic shape are added to the aggregate list for the content provider (step 308). Note that in the case where a previous instance of the keyword for a geographic shape having a lower z-order is in the aggregate list, the previous instance of the keyword is replaced by the keyword and corresponding weight for the current geographic shape.

Note that in one embodiment, the request from the requestor includes a number of keywords. If the request includes a number of keywords, then, in this embodiment, the keyword assigned to the geographic shape may be added to the aggregate list only if it matches a keyword in the request and is either a new keyword for the aggregate list or is to replace a previous instance of the keyword in the aggregate list associated with a geographic shape of the content provider having a lower z-order, or importance level.

At this point whether proceeding from step 306 or step 308, a determination is made as to whether there are more keywords assigned to the geographic shape (step 310). If so, steps 304 through 310 are repeated until all of the keywords assigned to the geographic shape have been processed. Once all of the keywords for the geographic shape have been processed, a determination is made as to whether there are more geographic shapes for the content provider (step 312). If so, steps 300 through 312 are repeated until all of the geographic shapes for the content provider have been processed. At that point, one or more content items of the content provider are selected based on the aggregate list of the keywords (step 314). More specifically, in one embodiment, each of the content items of the content provider may be scored as a function of the keywords in the aggregate list of keywords and corresponding weights for the keywords in the aggregate list of keywords as compared to the keywords assigned to the content items of the content provider. One or more content items having the highest score(s) may then be selected as content items to be delivered to the requestor.

FIGS. 6A through 6C graphically illustrate the process of FIG. 5 according to one embodiment of the present invention. FIG. 6A illustrates geographic shapes defined by a content provider to select geographic areas of interest to the content provider. In this example, the content provider is a streaming audio provider operating to stream audio content including music to users over, for example, an Internet Protocol (IP) based network such as the Internet. However, the present invention is not limited thereto. More specifically, as illustrated in FIG. 6A, the audio provider has defined a geographic shape 46 selecting the state of North Carolina and geographic shapes 48 through 56 selecting corresponding geographic areas within the state of North Carolina. FIG. 6B illustrates keywords and corresponding weights assigned to each of the geographic areas 46 through 56 by the audio provider as well as z-order values, or importance levels, assigned to the geographic shapes 46 through 56 by the audio provider. Note that in this example, the keywords are music genres.

FIG. 6C illustrates an aggregate list of keywords and corresponding weights generated using the process of FIG. 5 in response to a request from a requestor located at a point 58 (FIG. 6A). The point 58, and thus the requestor, is located within the geographic shapes 46 and 54. Therefore, using the process of FIG. 5, the keywords assigned to the geographic shapes 46 and 54 are aggregated to provide the following aggregate list of keywords: Rock with a weight of 80, Country with a weight of 30, Pop with a weight of 30, and Jazz with a weight of 10. Based on the aggregate list of keywords, a number of songs provided by the audio provider are selected and utilized to provide a customized audio stream for the requestor. More specifically, in one embodiment, songs made available by the audio provider may be scored based on the aggregate list of keywords including the weights assigned to the keywords in the aggregate list of keywords as compared to the keywords assigned to the songs of the content provider. Then, one or more songs having the highest score(s) are selected as songs for the customized audio stream for the requestor.

FIGS. 7A and 7B graphically illustrate a process by which a damping factor is defined and utilized for two exemplary geographic shapes. FIG. 7A illustrates a line 60, where the line 60 is a geographic shape. The line 60 and a damping factor operate to select a corresponding geographic area 62. The damping factor reduces weights assigned to keywords associated with the line 60 as a function of a distance of a requestor from the line 60. For example, if the damping factor is 10% per mile, then a distance (d) defining the edge of the geographic area 62 selected by the line 60 and damping factor is 10 miles, which is the distance at which the weights assigned to the keywords for the line 60 will be reduced to zero. As an example, if a request is received from a requestor located at point 64 being four miles from the line 60, the damping factor reduces the initial weights assigned to the keywords by 40% (4 miles×10% per mile) to provide resulting weights utilized for the selection of content to be delivered to the requestor.

FIG. 7B illustrates a circle 66 selecting a corresponding geographic area. In addition, in this embodiment, a damping factor is associated with the circle 66. Alternatively, a separate damping factor may be assigned to each keyword associated with the circle 66. The damping factor operates to reduce the weights assigned to the keywords associated with the circle 66 as a function of a distance of a requestor located outside of the circle 66 from the circle 66. Thus, if a request is received from a requestor located inside the circle 66, the weights assigned to the keywords are unchanged. However, if a request is received from a requestor located outside of the circle 66, then the weights assigned to the keywords are reduced as a function of the distance of the requestor from the circle 66. The damping factor effectively enlarges the geographic area selected by the circle 66 to include an additional geographic area defined by a distance (d) from the circle 66. The distance (d) is indirectly defined by the damping factor.

As an example, if the damping factor reduces the weights assigned to the keywords for the circle 66 by 10% per each mile from the circle 66, then the distance (d) is 10 miles. Continuing this example, if a request is received from a requestor located outside of the circle 66 by four miles, then the weights assigned to the keywords for the circle 66 may be reduced by 40%.

FIG. 8 illustrates a process for predicting the success of a content provider for a particular geographic shape defined by the content provider. This process may be utilized in combination with the process of FIG. 1, as a standalone process, or as part of a process other than that shown in FIG. 1. Note that this example focuses on predicting the success of an advertisement campaign of an advertiser. However, the process is not limited to advertisements and may also be used for other types of content.

First, user input is received from an advertiser defining a geographic shape selecting a geographic area desired by the advertiser (step 400). In addition, user input is received from the advertiser defining one or more criteria identifying target users for an advertisement campaign of the advertiser (step 402). The one or more criteria may be, for example, demographic criteria such as, but not limited to, an income level, age or age range, gender, or the like. In addition or alternatively, the one or more criteria may include one or more media preferences of target users (e.g., preferred music genres, preferred music artists, etc.), one or more items recently purchased, one or more websites recently visited, or the like. Note that the exemplary criteria given above for identifying target users is not intended to limit the scope of the present invention. Any other criteria for identifying target users may be used.

Then, the success of the advertisement campaign of the advertiser in the geographic area selected by the defined geographic shape is predicted (step 404). More specifically, in one embodiment, user profiles are maintained or otherwise accessible for users. The user profile for a user may include, for example, demographic information such as an income level of the user, the age of the user, the gender of the user, or the like. In addition or alternatively, the user profile may include media preferences of the user (e.g., preferred music genres, preferred music artist, etc.), a purchase history of the user, websites previously visited by the user, or the like. Note that numerous additional or alternative types of information that may be included in the user profile will be apparent to one of ordinary skill in the art upon reading this disclosure and are to be considered within the scope of the present invention.

The user profiles of users located within the geographic area selected by the defined geographic shape, users historically located within the geographic area selected by the defined geographic shape, users expected to be located within the geographic area selected by the defined geographic shape, or any combination thereof may be compared to the one or more criteria identifying target users. Based on the comparison, the success of the advertisement campaign may then be predicted. For example, in one embodiment, the number or percentage of users matching the one or more criteria identifying target users is determined and compared to a threshold. If the number or percentage of users matching the one or more criteria identifying target users is above the threshold, then a prediction is made that the advertisement campaign will be successful. Otherwise, a prediction is made that the advertisement campaign will not be successful.

FIG. 9 illustrates a process for recommending changes or alterations to a geographic shape defined by a content provider. This process may be utilized in combination with the process of FIG. 1, as a standalone process, or as part of a process other than that shown in FIG. 1. Note that this example focuses on an advertiser. However, the process is not limited thereto and may also be used or other types of content providers. First, user input is received from an advertiser defining a geographic shape selecting a geographic area desired by the advertiser (step 500). In addition, user input is received from the advertiser defining one or more criteria identifying target users for an advertisement campaign of the advertiser (step 502). The one or more criteria may be, for example, demographic criteria such as, but not limited to, an income level, age or age range, gender, or the like. In addition or alternatively, the one or more criteria may include one or more media preferences of target users (e.g., preferred music genres, preferred music artists, etc.), one or more items recently purchased, one or more websites recently visited, or the like. Note that the exemplary criteria given above for identifying target users is not intended to limit the scope of the present invention. Any other criteria for identifying target users may be used.

Then, a revised geographic shape selecting a revised geographic area associated with users better satisfying the one or more criteria identifying target users is generated and recommended to the content provider (step 504). The content provider can then choose to reject or accept the revised geographic shape. More specifically, in one embodiment, user profiles are maintained or otherwise accessible for users. The user profile for a user may include, for example, demographic information such as an income level of the user, the age of the user, the gender of the user, or the like. In addition or alternatively, the user profile may include media preferences of the user (e.g., preferred music genres, preferred music artist, etc.), a purchase history of the user, websites previously visited by the user, or the like. Note that numerous additional or alternative types of information that may be included in the user profile will be apparent to one of ordinary skill in the art upon reading this disclosure and are to be considered within the scope of the present invention.

The user profiles of users located within the geographic area selected by the defined geographic shape, users historically located within the geographic area selected by the defined geographic shape, users expected to be located within the geographic area selected by the defined geographic shape, or any combination thereof may be compared to the one or more criteria identifying target users. In addition, user profiles of users near the boundaries of the defined geographic shape are compared to the one or more criteria identifying target users. Then, in one embodiment, the geographic area is revised to select areas having more than a threshold number or percentage of users satisfying the one or more criteria identifying target users, thereby generating the revised geographic shape to recommend to the content provider.

Figure 10A:
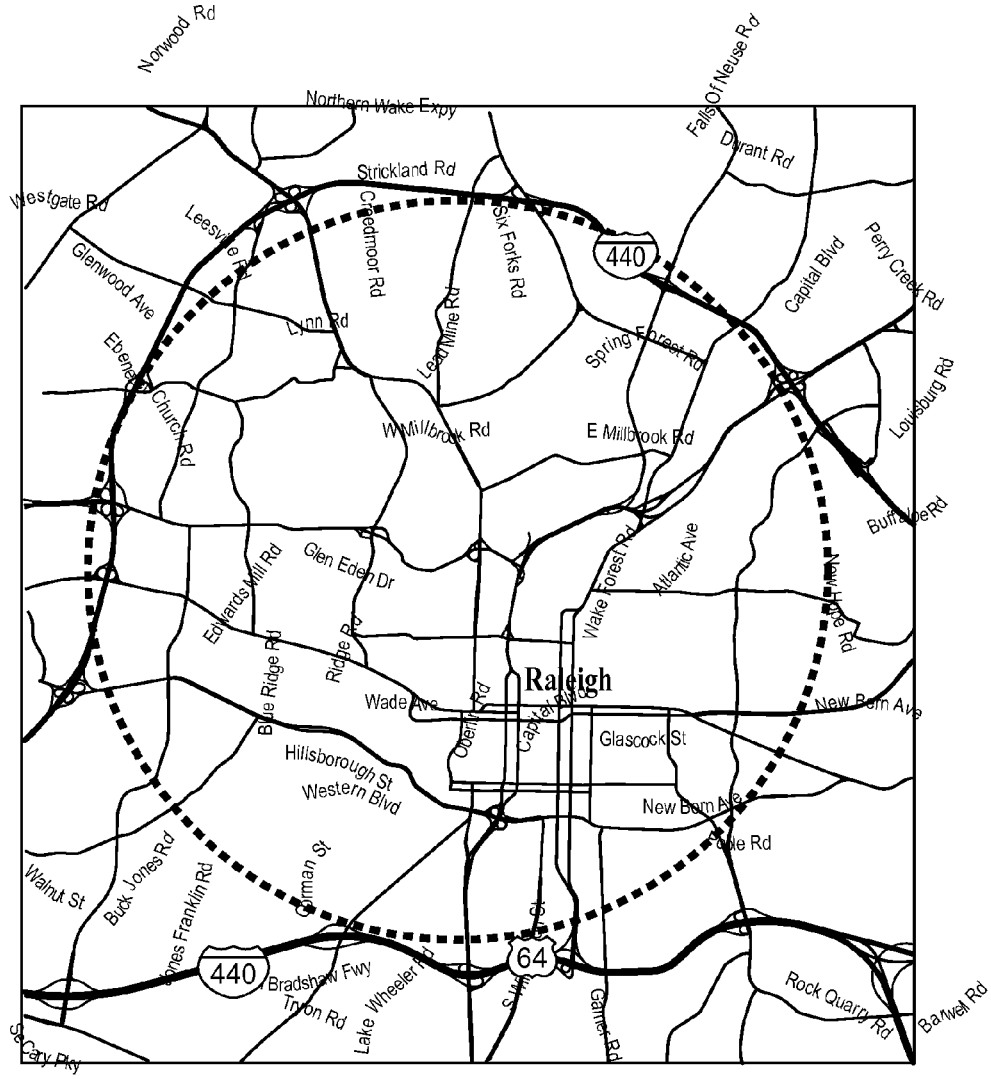
Figure 10B:
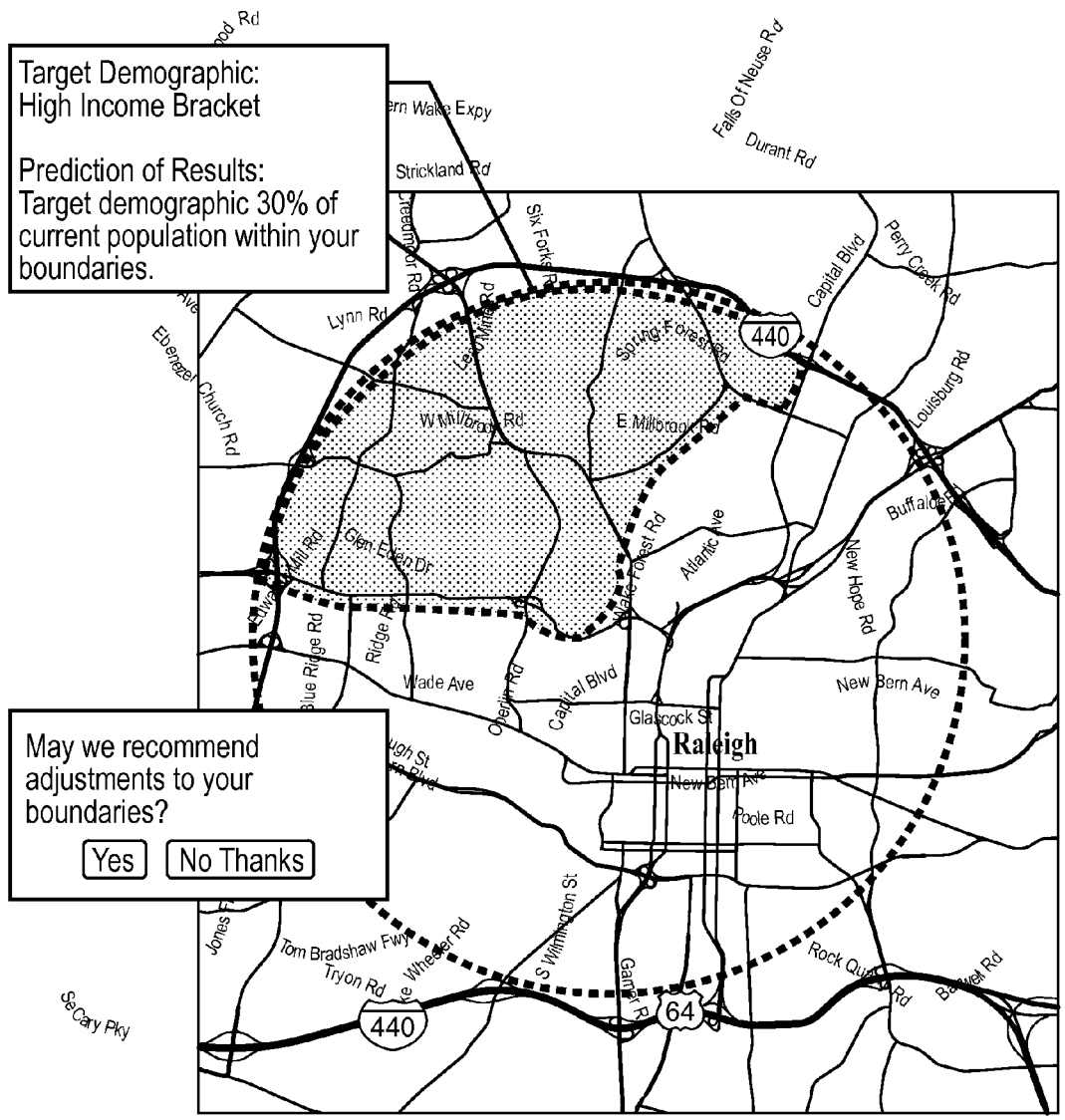
Figure 10C:
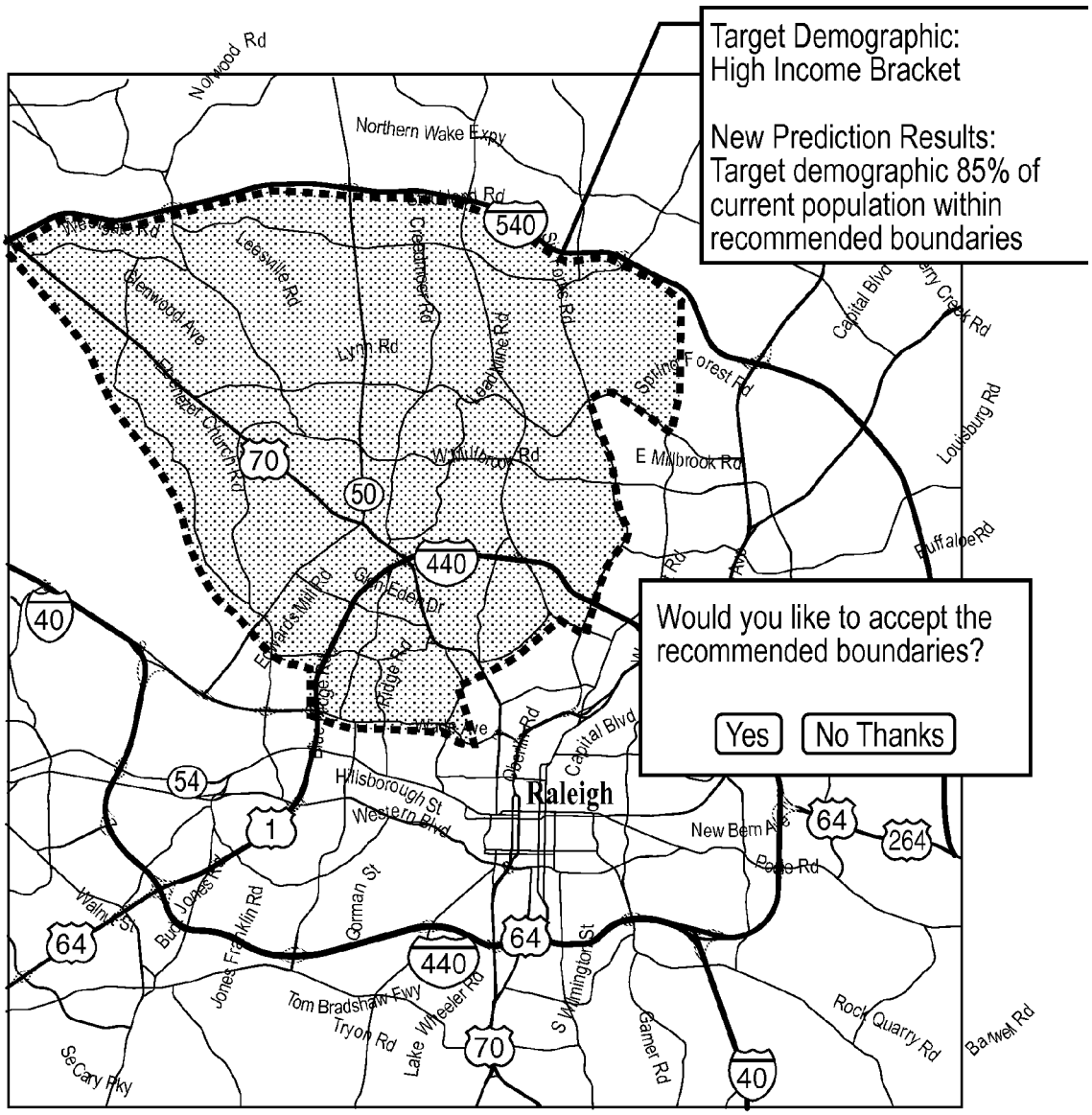

FIGS. 10A through 10D graphically illustrate the combined processes of FIGS. 8 and 9 according to one embodiment of the present invention. FIG. 10A illustrates a geographic shape defined by a content provider in order to select a desired geographic area. In response, the process of FIG. 8 is performed in order to predict the success of the content provided in the geographic area selected by the defined geographic shape shown in FIG. 10B. In this example, "high income level bracket" is provided as the criterion for identifying target users. The predicted results are that the target users, or the target demographic, form only 30% of the current population within the geographic area selected by the defined geographic shape. In this example, the content provider, or more specifically a user representing the content provider, then provides user input indicating that he desires recommended adjustments to the geographic shape. In response, a revised geographic shape is generated to select a geographic area having users that better satisfy the provided criterion for identifying target users, which in this example is "high income level bracket." FIG. 10C illustrates the revised geographic shape recommended to the content provider. In this example, in the geographic area selected by the revised geographic shape, 85% of the population is in the target demographic. The content provider can then choose to accept or reject the revised geographic shape.

Figure 10D:
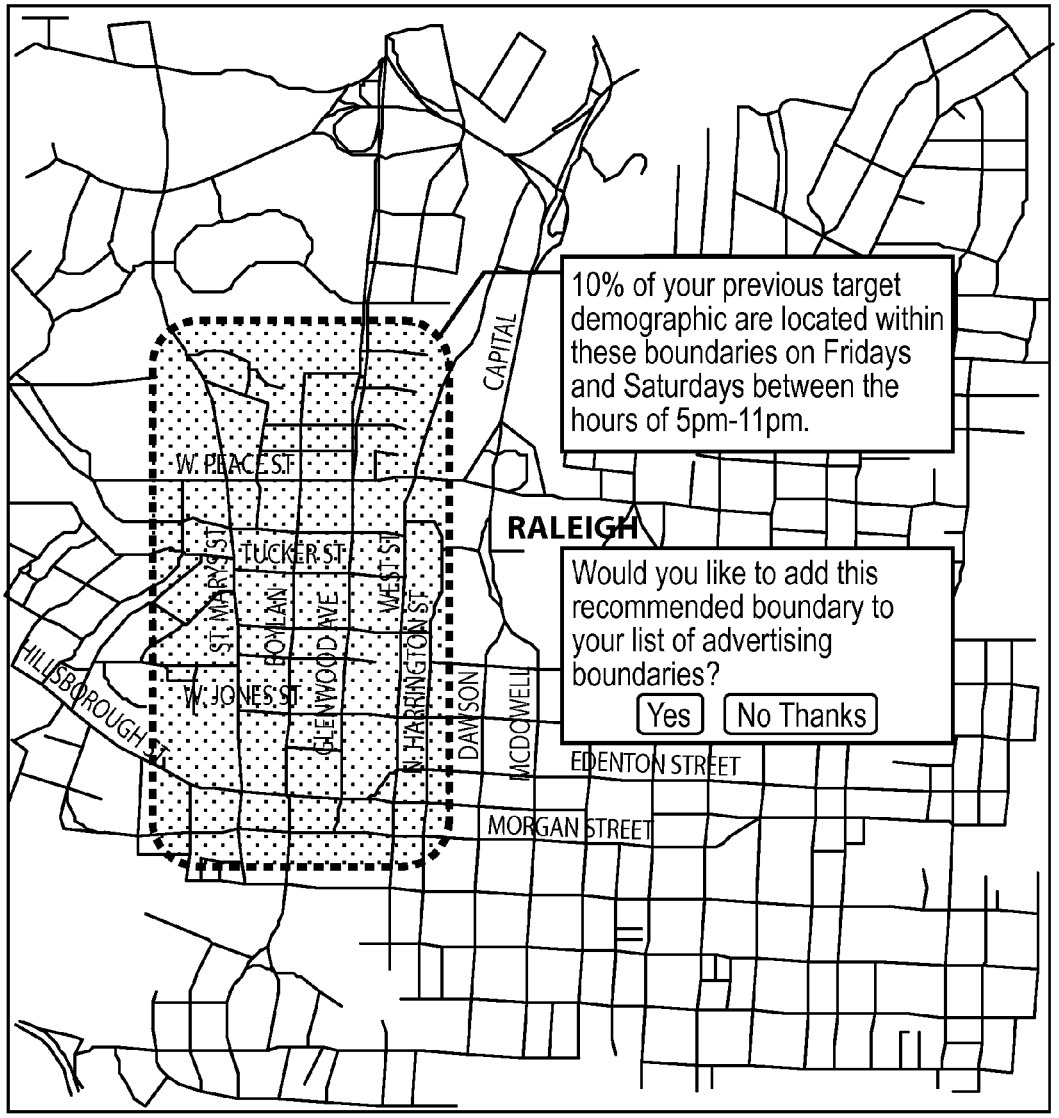

In addition, new geographic shapes may be recommended to the content provider. As an example, the user profiles of the target users in the geographic area selected by the revised geographic shape of FIG. 10C may include historical location information. Based on this historical location information, one or more geographic areas frequented by those target users may be identified and corresponding geographic shapes may be recommended to the content provider. For example, if 10% of the target users in the geographic area selected by the revised geographic shape frequently visit another geographic area, another geographic shape selecting that other geographic area may be recommended to the content provider as illustrated in FIG. 10D. The content provider may then choose to accept or reject the recommendation. Further, this new geographic shape may be time-dependent such that it is only active during one or more periods of time when the target users have historically visited that geographic area.

FIG. 11 illustrates a system 68 for customized content delivery according to one embodiment of the present invention. In general, the system 68 includes a central server 70 and a number of user devices 72-1 through 72-N having associated users 74-1 through 74-N. The central server 70 and the user devices 72-1 through 72-N are enabled to communicate via a network 76. The network 76 may be any type of Wide Area Network (WAN), Local Area Network (LAN), or the like, or any combination thereof. In addition, the network 76 may include wired components, wireless components, or both wired and wireless components. As an example, the network 76 may be the Internet.

The central server 70 includes a customized content delivery function 78, which may be implemented in software, hardware, or a combination thereof. In addition, the central server 70 may include a content repository 80. For each of a number of content providers, the content repository 80 may store the content items or references to the content items provided by each of the content providers. As discussed above, the content providers may be advertisers, media content providers, or the like. As such, the content items provided by the content providers may be advertisements, media items, or the like. Lastly, the central server 70 hosts or otherwise has access to a provider accounts repository 82, which includes a provider account, or account, for each of the content providers. As discussed above, an account of a content provider includes information defining geographic shapes defined by the content provider and, for each content item of the content provider, one or more keywords assigned to the content item. In addition, for each geographic shape defined by the content provider, the account of the content provider includes keywords assigned to the geographic shape as well as weights for those keywords. Lastly, the account may include a z-order, or importance level, for each of the geographic shapes.

Each of the user devices 72-1 through 72-N may be, for example, a personal computer, a set-top box, a mobile smart phone, a gaming console, or the like. The user device 72-1 optionally includes a location determination function 84-1. The location determination function 84-1 may be implemented in software, hardware, or a combination thereof and generally operates to determine or otherwise obtain a geographic location of the user device 72-1. For example, the location determination function 84-1 may be a GPS receiver. As another example, the user device 72-1 may be a mobile smart phone or similar mobile telecommunications device where the location of the user device 72-1 is determined using mobile base station triangulation. As a final example, the location determination function 84-1 may enable the user 74-1 to manually enter the location of the user device 72-1 by, for example, entering a street address, zip code, or the like. The user device 72-1 also includes a rendering function 86-1, which may be implemented in software, hardware, or a combination thereof. The rendering function 86-1 operates to render customized content received from the central server 70 to the user 74-1. Likewise, the other user devices 72-2 through 72-N include rendering functions 86-2 through 86-N and, optionally, location determination functions 84-2 through 84-N, respectively.

Using advertisers as an example, in operation, one or more advertisers register with the customized content delivery function 78. As discussed above, each advertiser defines a number of geographic shapes selecting corresponding geographic areas. Note that the customized content delivery function 78 may predict the success of the advertiser in the geographic areas selected by the geographic shapes and/or recommend revised geographic shapes in the manner discussed above with respect to FIGS. 8 and 9. Further, for each geographic shape, the advertiser assigns one or more keywords and corresponding weights to the geographic shape. In addition, the advertiser provides one or more keywords associated with each of a number of advertisements provided by the advertiser. The advertiser may also provide the advertisements to the central server 70 to be stored in the content repository 80.

Thereafter, a request is sent to the central server 70 from, for example, the user device 72-1. The request may be initiated by the user device 72-1 or the user 74-1. In one exemplary embodiment, the request is an Internet search request initiated by the user 74-1. As such, in response to the request and a location of the user 74-1, the customized content delivery function 78 selects one or more advertisements for the user 74-1 in the manner discussed above. The selected advertisements may then be delivered to the user 74-1 in association with results of the Internet search request. In another exemplary embodiment, the user device 72-1 may be a set-top box, and the request may be an automatic request by the user device 72-1 for advertisements to late-bind to video content being viewed or requested by the user 74-1. The customized content delivery function 78 may then select one or more advertisements and deliver or cause delivery of the advertisements to the user device 72-1. The rendering function 86-1 may then perform a late-binding process to insert the advertisements into the video content presented to the user 74-1. In this example, the advertisements may be commercials such as those included in traditional television programming. Note that these two exemplary embodiments are illustrative and not intended to limit the scope of the present invention. Numerous variations will be apparent to one of ordinary skill in the art upon reading this disclosure and are to be considered within the scope of the present invention. Also note that while the discussion of FIG. 11 has primarily focused on an embodiment where the one or more content providers are advertisers, the present invention is not limited thereto. The system 68 of FIG. 11 may also be used for embodiments where the content providers are one or more media content providers or include both one or more advertisers and one or more media content providers.

It should be noted that due to the arbitrary nature of the geographic shapes that may be defined by the content providers, it could become computationally expensive to sift through all geographic shapes given a request from a requester located at a specific position. Thus, in one embodiment, an overall geographic area from which the content providers may select may be divided into a number of cells as illustrated in FIG. 12. In this example, the overall geographic area from which the content providers may select is North America. However, for clarity, FIG. 12 only illustrates the state of Texas and surrounding areas. As shown, the overall geographic area is divided into a number of cells, which in this example are polygonal cells. However, the present invention is not limited thereto. For example, in another embodiment, the overall geographic area may be segmented using longitude and latitude lines. In operation, when a content provider defines a geographic shape, the corresponding cells of the overall geographic area are identified and recorded. In this example, the defined geographic shape corresponds to the state of Texas. As such, as indicated by the highlighted cells, each cell partially or completely included within the state of Texas is identified and recorded with respect to the geographic shape. Thereafter, when a request is received from a requestor, the cell in which the requestor is located is first determined. Then, geographic shapes including that cell are identified as geographic shapes in which the requester is located.

FIG. 13 is a block diagram of the central server 70 of FIG. 11 according to one embodiment of the present invention. In general, the central server 70 includes a control system 88 having associated memory 90. In this example, the customized content delivery function 78 is implemented in software and stored in the memory 90. However, the present invention is not limited thereto. The customized content delivery function 78 may be implemented in software, hardware, or a combination thereof. In addition, the central server 70 may include one or more digital storage devices 92 such as one or more hard disk drives or the like. The provider accounts repository 82 and the content repository 80 may be stored in the one or more digital storage devices 92, the memory 90, or a combination thereof. The central server 70 also includes a communication interface 94 communicatively coupling the central server 70 to the network 76 (FIG. 11). Lastly, the central server 70 may include a user interface 96, which may include components such as a display, one or more user input devices, or the like.

FIG. 14 is a block diagram of the user device 72-1 of FIG. 11 according to one embodiment of the present invention. This discussion is equally applicable to the other user devices 72-2 through 72-N. In general, the user device 72-1 includes a control system 98 having associated memory 100. In this example, the rendering function 86-1 is implemented in software and stored in the memory 100. However, the present invention is not limited thereto. The rendering function 86-1 may be implemented in software, hardware, or a combination thereof. In this example, the location determination function 84-1 is implemented in hardware. For example, the location determination function 84-1 may be a GPS receiver associated with the control system 98. However, the present invention is not limited thereto. The location determination function 84-1 may be implemented in software, hardware, or a combination thereof. The user device 72-1 also includes a communication interface 102 communicatively coupling the user device 72-1 to the network 76 (FIG. 11). Lastly, the user device 72-1 includes a user interface 104, which may include components such as, for example, a display, one or more user input devices, or the like.

The present invention provides substantial opportunity for variation without departing from the spirit or scope of the present invention. For example, while the discussion herein primarily focuses on the use of keywords, the present invention is not limited thereto. Other types of tags may be used in addition to or as an alternative to keywords. As an example, demographic criteria may be used in addition to or as an alternative to keywords. Thus, a content provider may additionally or alternatively assign other types of tags to their content items and their geographic shapes.

As another example, the geographic shapes defined by an advertiser may be static or time-varying. More specifically, a geographic shape may be static in that it is always active once defined and has boundaries that do not change unless manually changed by the content provider. Alternatively, a geographic shape may be time-varying in that it may only be active in response to one or more triggering events, be active only during defined periods of time, have boundaries that vary over time, or the like, or any combination thereof. For example, an advertiser of a soft drink may define a geographic shape and a trigger for the geographic shape such that the geographic shape is only active if the outside temperature in the corresponding geographic area is greater than 80 degrees Fahrenheit. As another example, a content provider may define a geographic shape such that the geographic shape is only active during one or more defined periods of time (e.g., times of day, days of week, or the like). As a final example, a content provider may define a geographic shape such that the boundaries of the geographic shape vary based on time or in response to triggering events. More specifically, the boundaries of the geographic shape may vary based on time of day, day of the week, month of the year, or the like. In addition or alternatively, the boundaries of the geographic shape may vary based on a triggering event such as, for example, the outside temperature in the corresponding geographic area exceeding 80 degrees Fahrenheit.

Those skilled in the art will recognize improvements and modifications to the preferred embodiments of the present invention. All such improvements and modifications are considered within the scope of the concepts disclosed herein and the claims that follow.

What is claimed is:

1. A method implemented by a server computer, comprising:
receiving, from a content provider, information defining a plurality of geographic shapes, each geographic shape corresponding to an approximate geographic outline of a respective geographic area and being assigned an importance level;
for each geographic shape of the plurality of geographic shapes, receiving information from the content provider defining one or more tags assigned to the geographic shape, each tag being associated with a corresponding tag weight;
receiving a request from a requestor;
determining a location of the requestor;
based on the location of the requestor, identifying one or more geographic shapes in which the requestor is located from the plurality of geographic shapes;
selecting one or more content items from a plurality of content items of the content provider based on the one or more tags and corresponding tag weights assigned to the one or more geographic shapes in which the requestor is located, wherein conflicts between tags assigned to the geographic shapes are resolved based on the assigned importance levels of the geographic shapes; and effecting delivery of the one or more content items to the requestor.

2. The method of claim 1 wherein each of the plurality of geographic shapes at least partially overlaps at least one other of the plurality of geographic shapes.

3. The method of claim 1 wherein the requestor is located within at least two geographic shapes of the plurality of geographic shapes, and selecting the one or more content items comprises:
   aggregating the one or more tags assigned to the at least two geographic shapes in which the requestor is located according to the importance levels assigned to the at least two geographic shapes to provide an aggregate list of tags and corresponding tag weights; and
   selecting the one or more content items from the plurality of content items of the content provider based on the aggregate list of tags and corresponding tag weights.

4. The method of claim 3 wherein when aggregating the one or more tags assigned to the at least two geographic shapes, if a first tag of the one or more tags assigned to a first geographic shape of the at least two geographic shapes conflicts with a second tag of the one or more tags assigned to a second geographic shape of the at least two geographic shapes, then the first tag and corresponding tag weight overrides the second tag and corresponding tag weight if the first geographic shape is assigned a higher importance level than the second geographic shape, and the second tag and corresponding tag weight overrides the first tag and corresponding tag weight if the second geographic shape is assigned a higher importance level than the first geographic shape.

5. The method of claim 4 wherein a conflict exists between the first tag and the second tag because the first tag and the second tag are a common tag and the corresponding weight assigned to the common tag for the first geographic shape is different than the corresponding weight assigned to the common tag for the second geographic shape.

6. The method of claim 4 wherein a conflict exists between the first tag and the second tag because the first tag and the second tag are mutually exclusive.

7. The method of claim 3 wherein selecting the one or more content items from the plurality of content items of the content provider based on the aggregate list of tags and corresponding tag weights comprises:
   scoring each of the plurality of content items of the content provider based on the aggregate list of tags and corresponding tag weights to provide scores for the plurality of content items; and
   selecting the one or more content items from the plurality of content items based on the scores.

8. The method of claim 1 wherein the content provider is an advertiser and the plurality of content items is a plurality of advertisements.

9. The method of claim 1 wherein the content provider is a media content provider and the plurality of content items is a plurality of media items.

10. The method of claim 1 wherein the plurality of content items comprises at least one advertisement and at least one media item.

11. The method of claim 1 wherein, for each geographic shape of the plurality of geographic shapes, the one or more tags assigned to the geographic shape comprise one or more keywords.

12. The method of claim 11 wherein the request comprises one or more keywords, and selecting the one or more content items comprises:
   identifying at least one tag that matches the one or more keywords in the request from the one or more tags assigned to the one or more geographic shapes in which the requestor is located; and
   selecting the one or more content items from the plurality of content items based on the at least one tag and corresponding tag weight.

13. The method of claim 1 wherein, for each geographic shape of the plurality of geographic shapes, the one or more tags assigned to the geographic shape comprise one or more demographic criteria.

14. The method of claim 13 wherein selecting the one or more content items comprises:
   identifying at least one tag that matches demographic information associated with the requestor from the one or more tags assigned to the one or more geographic shapes in which the requestor is located; and
   selecting the one or more content items from the plurality of content items based on the at least one tag and corresponding tag weight.

15. The method of claim 1 further comprising, for at least one of the plurality of geographic shapes, predicting success of the content provider in the corresponding one of the plurality of geographic areas.

16. The method of claim 1 further comprising, for at least one of the plurality of geographic shapes, recommending a revised geographic shape to the content provider.

17. The method of claim 1 wherein the content provider further defines a damping factor for at least one geographic shape of the one or more geographic shapes in which the requestor is located, and selecting the one or more content items comprises selecting the one or more content items from the plurality of content items of the content provider based on the one or more tags and corresponding tag weights assigned to the one or more geographic shapes in which the requestor is located and the damping factor for the at least one geographic shape.

18. The method of claim 17 wherein the damping factor operates to reduce the corresponding weights of the one or more tags assigned to the at least one geographic shape as a function of a distance of the requestor from the at least one geographic shape.

19. The method of claim 1, wherein the plurality of content items comprises at least one advertisement.

20. A method implemented by a server computer comprising:
   for each content provider of a plurality of content providers:
      receiving information from the content provider defining a plurality of geographic shapes, each geographic shape corresponding to an approximate geographic outline of a respective geographic area and being assigned an importance level; and
      for each geographic shape of the plurality of geographic shapes, receiving information from the content provider defining one or more tags assigned to the geographic shape, each tag being associated with a corresponding tag weight;
   receiving a request from a requestor;
   determining a location of the requestor;
   for each content provider of the plurality of content providers, based on the location of the requestor, identifying one or more of the geographic shapes in which the requestor is located from the plurality of geographic shapes defined by the content provider;
   selecting a select content provider for which to deliver one or more content items to the requestor from the plurality of content providers;

selecting one or more content items from a plurality of content items of the select content provider based on the one or more and corresponding tag weights assigned to the one or more geographic shapes in which the requestor is located, wherein conflicts between tags assigned to the geographic shapes are resolved based on the assigned importance levels of the geographic shapes; and effecting delivery of the one or more content items to the requestor.

21. The method of claim 20 wherein, for each content provider of the plurality of content providers, each of the plurality of geographic shapes at least partially overlaps at least one other of the plurality of geographic shapes.

22. The method of claim 20 wherein selecting the select content provider comprises:
for each content provider of the plurality of content providers:
aggregating the one or more tags assigned to the one or more geographic shapes in which the requestor is located according to the importance levels assigned to the one or more geographic shapes to provide an aggregate list of tags and corresponding tag weights for the content provider; and
generating a bid for the content provider as a function of the corresponding tag weights of tags in the aggregate list of tags for the content provider; and
selecting a one of the plurality of content providers having a highest bid as the select content provider.

23. The method of claim 22 wherein selecting the one or more content items comprises selecting the one or more content items from the plurality of content items of the select content provider based on the aggregate list of tags and corresponding tag weights for the select content provider.

24. The method of claim 22 wherein when aggregating the one or more tags assigned to the one or more geographic shapes in which the requestor is located, if a first tag of the one or more tags assigned to a first geographic shape of the one or more geographic shapes conflicts with a second tag of the one or more tags assigned to a second geographic shape of the one or more geographic shapes, then the first tag and corresponding tag weight overrides the second tag and corresponding tag weight if the first geographic shape is assigned a higher importance level than the second geographic shape, and the second tag and corresponding tag weight overrides the first tag and corresponding tag weight if the second geographic shape is assigned a higher importance level than the first geographic shape.

25. The method of claim 20 wherein, for each geographic shape of the plurality of geographic shapes, the one or more tags assigned to the geographic shape comprise one or more keywords.

26. The method of claim 25 wherein the request comprises one or more keywords, and selecting the one or more content items comprises:
identifying at least one tag that matches the one or more keywords in the request from the one or more tags assigned to the one or more geographic shapes defined by the select content provider in which the requestor is located; and
selecting the one or more content items from the plurality of content items of the select content provider based on the at least one tag and corresponding tag weight.

27. The method of claim 20 wherein, for each geographic shape of the plurality of geographic shapes, the one or more tags assigned to the geographic shape comprise one or more demographic criteria.

28. The method of claim 27 wherein selecting the one or more content items comprises:
identifying at least one tag that matches demographic information associated with the requestor from the one or more tags assigned to the one or more geographic shapes defined by the select content provider in which the requestor is located; and
selecting the one or more content items from the plurality of content items based on the at least one tag and corresponding tag weight.

29. The method of claim 20 further comprising, for at least one of the plurality of geographic shapes defined by one of the plurality of content providers, predicting success of the one of the plurality of content providers in the corresponding one of the plurality of geographic areas.

30. The method of claim 20 further comprising, for at least one of the plurality of geographic shapes defined by one of the plurality of content providers, recommending a revised geographic shape to the one of the plurality of content providers.

31. The method of claim 20 wherein the select content provider further defines a damping factor for at least one geographic shape of the one or more geographic shapes defined by the select content provider and in which the requestor is located, and selecting the one or more content items comprises selecting the one or more content items from the plurality of content items of the select content provider based on the one or more tags and corresponding tag weights assigned to the one or more geographic shapes defined by the select content provider and in which the requestor is located and the damping factor for the at least one geographic shape.

32. The method of claim 31 wherein the damping factor operates to reduce the corresponding weights of the one or more tags assigned to the at least one geographic shape as a function of a distance of the requestor from the at least one geographic shape.

33. The method of claim 20, wherein the plurality of content items comprises at least one advertisement.

34. A system comprising:
a communication interface communicatively coupling the system to a network; and
a control system associated with the communication interface and adapted to:
receive, via the network, information from a content provider defining a plurality of geographic shapes, each geographic shape corresponding to an approximate geographic outline of a respective geographic area and being assigned an importance level;
for each geographic shape of the plurality of geographic shapes, receive, via the network, information from the content provider defining one or more tags assigned to the geographic shape, each tag being associated with a corresponding tag weight;
receive, via the network, a request from a requestor;
determine a location of the requestor;
based on the location of the requestor, identify one or more of the geographic shapes in which the requestor is located from the plurality of geographic shapes;
select one or more content items from a plurality of content items of the content provider based on the one or more tags and corresponding tag weights assigned to the one or more geographic shapes in which the requestor is located, wherein conflicts between tags assigned to the geographic shapes are resolved based on the assigned importance levels of the geographic shapes; and
effect delivery of the one or more content items to the requestor.

35. The system of claim 34, wherein the plurality of content items comprises at least one advertisement.

36. A system comprising:
a communication interface communicatively coupling the system to a network; and
a control system associated with the communication interface and adapted to:
for each content provider of a plurality of content providers:
receive, via the network, information from the content provider defining a plurality of geographic shapes, each geographic shape corresponding to an approximate geographic outline of a respective geographic area and being assigned an importance level; and
for each geographic shape of the plurality of geographic shapes, receive, via the network, information from the content provider defining one or more tags assigned to the geographic shape, each tag being associated with a corresponding tag weight;
receive, via the network, a request from a requestor;
determine a location of the requestor;
for each content provider of the plurality of content providers, based on the location of the requestor, identify one or more of the geographic shapes in which the requestor is located from the plurality of geographic shapes defined by the content provider;
select a select content provider for which to deliver one or more content items to the requestor from the plurality of content providers;
select one or more content items from a plurality of content items of the select content provider based on the one or more tags and corresponding tag weights assigned to the one or more geographic shapes in which the requestor is located, wherein conflicts between tags assigned to the geographic shapes are resolved based on the assigned importance levels of the geographic shapes; and
effect delivery of the one or more content items to the requestor.

37. The system of claim 36, wherein the plurality of content items comprises at least one advertisement.

* * * * *